(12) United States Patent
Zhang et al.

(10) Patent No.: US 7,978,784 B2
(45) Date of Patent: Jul. 12, 2011

(54) ANTENNA SELECTION AND TRAINING USING A SPATIAL SPREADING MATRIX FOR USE IN A WIRELESS MIMO COMMUNICATION SYSTEM

(75) Inventors: Hongyuan Zhang, Sunnyvale, CA (US); Rohit U. Nabar, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 712 days.

(21) Appl. No.: 12/105,750

(22) Filed: Apr. 18, 2008

(65) Prior Publication Data

US 2008/0260002 A1 Oct. 23, 2008

Related U.S. Application Data

(60) Provisional application No. 60/913,070, filed on Apr. 20, 2007.

(51) Int. Cl.
*H04L 27/00* (2006.01)

(52) U.S. Cl. ........ 375/299; 375/146; 375/219; 375/267; 455/101

(58) Field of Classification Search .................. 375/141, 375/146, 219, 260, 267, 285, 295, 299, 347; 455/91, 101
See application file for complete search history.

(56) References Cited

U.S. PATENT DOCUMENTS

| 6,917,820 | B2 | 7/2005 | Gore et al. |
|---|---|---|---|
| 7,120,395 | B2 * | 10/2006 | Tong et al. ................. 455/101 |
| 7,657,244 | B2 * | 2/2010 | Niu et al. .................. 455/277.1 |
| 2005/0075081 | A1 * | 4/2005 | Catreux-Erceg et al. ....... 455/78 |

FOREIGN PATENT DOCUMENTS

| WO | WO03/034614 | 4/2003 |
|---|---|---|
| WO | WO 2005/034387 | 4/2005 |
| WO | WO 2007/040515 | 4/2007 |

OTHER PUBLICATIONS

International Search Report in corresponding PCT/US08/60903 dated Jul. 21, 2009.
Written Opinion in corresponding PCT/US08/60903 dated Jul. 21, 2009.
Bjerke et al., "Packet Error Probability Prediction for System Level Simulations of MIMO-OFDM Based 802.11 WLANs," IEEE (4) 2538-2542, May 2005.
Gorokhov et al., "Transmit/Receive MIMO Antenna Subset Selection," IEEE (2) 13-16, May 2004.
Ketchum et al., "System Description and Operating Principles for High Throughput Enhancements," IEEE, 2-137, Aug. 2004.
Molisch et al., "MIMO Systems withy Antenna Selection," IEEE Microwave Magazine, 46-56, Mar. 2004.
International Preliminary Examination Report in corresponding PCT/US08/60903 dated Oct. 20, 2009.

* cited by examiner

*Primary Examiner* — Dac V Ha

(57) ABSTRACT

A wireless communication system and method uses a spatial spreading matrix to distribute the encoded spatial data streams to a number of transmit chains and further uses the spatial spreading matrix for antenna selection computation in a transmitter. The spatial spreading matrix is designed such that a receiver is able to know and utilize the spatial spreading matrix for computing transmission antenna selection, receiver antenna selection and joint transmission/receiving antenna selection. The use of this spatial spreading matrix for antenna selection computation provides increased accuracy in antenna selection for transmission of spatial data streams, where the number of spatial data streams is less than the number of transmit or receive chains between the transmitter and receiver, and the number of transmit or receive chains is less than the corresponding transmission or receiving antennas.

30 Claims, 10 Drawing Sheets

ANTENNA SELECTION AND TRAINING USING A SPATIAL SPREADING MATRIX FOR USE IN A WIRELESS MIMO COMMUNICATION SYSTEM

RELATED APPLICATION

This is a regular-filed application which is based on and claims priority to U.S. Provisional Patent Application Ser. No. 60/913,070, entitled "Antenna Selection Computation and Training Considering MIMO Spatial Mapping," which was filed on Apr. 20, 2007, the entire disclosure of which is hereby incorporated by reference herein.

FIELD OF TECHNOLOGY

The disclosure relates generally to wireless communication systems and, more particularly, to a system and method for the simultaneous transmission of multiple streams of information or data in a multiple-input, multiple-output wireless communication system.

DESCRIPTION OF THE RELATED ART

An ever-increasing number of relatively inexpensive, low power wireless data communication services, networks and devices have been made available over the past number of years, promising near wire speed transmission and reliability. Various wireless technologies are described in detail in the 802.11 IEEE Standards, including for example, the IEEE Standard 802.11a (1999) and its updates and amendments, the IEEE Standard 802.11g (2003), and the IEEE Standard 802.11n that is now in the process of being adopted, all of which are collectively incorporated herein fully by reference. These standards have been or are in the process of being commercialized with the promise of 54 Mbps or more effective throughput, making them a strong competitor to traditional wired Ethernet and the more common "802.11b" or "WiFi" 11 Mbps mobile wireless transmission standard.

Generally speaking, transmission systems compliant with the IEEE 802.11a and 802.11g or "802.11a/g" as well as the 802.11n standards achieve their high data transmission rates using Orthogonal Frequency Division Modulation (OFDM) encoded symbols mapped up to a 64 quadrature amplitude modulation (QAM) multi-carrier constellation. In a general sense, the use of OFDM divides the overall system bandwidth into a number of frequency sub-bands or channels, with each frequency sub-band being associated with a respective sub-carrier upon which data may be modulated. Thus, each frequency sub-band of the OFDM system may be viewed as an independent transmission channel within which to send data, thereby increasing the overall throughput or transmission rate of the communication system.

Transmitters used in the wireless communication systems that are compliant with the aforementioned 802.11a/802.11g/802.11n standards as well as other standards such as the 802.16a IEEE Standard, typically perform multi-carrier OFDM symbol encoding (which may include error correction encoding and interleaving), convert the encoded symbols into the time domain using Inverse Fast Fourier Transform (IFFT) techniques, and perform digital to analog conversion and conventional radio frequency (RF) upconversion on the signals. These transmitters then transmit the modulated and upconverted signals after appropriate power amplification to one or more receivers, resulting in a relatively high-speed time domain signal with a large peak-to-average ratio (PAR).

Likewise, the receivers used in the wireless communication systems that are compliant with the aforementioned 802.11a/802.11g/802.11n and 802.16a IEEE standards typically include an RF receiving unit that performs RF downconversion and filtering of the received signals (which may be performed in one or more stages), and a baseband processor unit that processes the OFDM encoded symbols bearing the data of interest. The digital form of each OFDM symbol presented in the frequency domain is recovered after baseband downconverting, conventional analog to digital conversion and Fast Fourier Transformation of the received time domain signal. Thereafter, the baseband processor performs demodulation and frequency domain equalization (FEQ) to recover the transmitted symbols, and these symbols are then processed with an appropriate FEC decoder, e.g. a Viterbi decoder, to estimate or determine the most likely identity of the transmitted symbol. The recovered and recognized stream of symbols is then decoded, which may include deinterleaving and error correction using any of a number of known error correction techniques, to produce a set of recovered signals corresponding to the original signals transmitted by the transmitter.

In wireless communication systems, the RF modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and generally to enhance effective encoding and modulation in a wireless communication system, each receiver of the wireless communication system may periodically develop or collect channel state information (CSI) for each of the frequency channels, such as the channels associated with each of the OFDM sub-bands discussed above. Generally speaking, CSI is information describing one or more characteristics of each of the OFDM channels (for example, the gain, the phase and the SNR of each channel). Upon determining the CSI for one or more channels, the receiver may send this CSI back to the transmitter, which may use the CSI for each channel to precondition the signals transmitted using that channel so as to compensate for the varying propagation effects of each of the channels.

To further increase the number of signals which may be propagated in the communication system and/or to compensate for deleterious effects associated with the various propagation paths, and to thereby improve transmission performance, it is known to use multiple transmission and receive antennas within a wireless transmission system. Such a system is commonly referred to as a multiple-input, multiple-output (MIMO) wireless transmission system and is specifically provided for within the 802.11n IEEE Standard now being adopted. As is known, the use of MIMO technology produces significant increases in spectral efficiency, throughput and link reliability, and these benefits generally increase as the number of transmission and receive antennas within the MIMO system increases.

In particular, in addition to the frequency channels created by the use of OFDM, a MIMO channel formed by the various transmission and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. Of course, the spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

Typically, data is transmitted along one or more receive chains at the receiver and one or more transmitting chains at the transmitter. The data streams in the chain-to-chain transmission are transmitted via a channel matrix, which is described as the full MIMO channel between the transmission and receiving antennas. Where the number of receive chains is less than the number of receiving antennas and/or the number of transmit chains is less than the number of transmission antennas, the actual channel matrix used for transmitting the data streams is a sub-matrix of the full-dimensional channel matrix. Because the channel coefficients corresponding to the different antennas are different, it is important to select the appropriate antennas to transmit and/or receive the transmission. There are many known techniques for antenna selection and training, which are typically conducted based on an estimation of the channel sub-matrix.

When mapping encoded spatial data streams to the transmit chains, a full-dimensional channel spatial spreading matrix is applied, and antenna selection is based on the full-dimensional channel spatial spreading matrix. The value for the full-dimensional channel spatial spreading matrix is typically standardized or otherwise known to both the transmitter and receiver. However, there are instances in which the actual data transmission of encoded spatial data streams includes a number of spatial data streams that is less than the number of transmit chains. Because it is desirable to transmit all signals from all available transmit chains in order to maximize the channel gain, the spatial mapping of the spatial data streams to the transmit chains is performed by applying a spatial spreading matrix before transmitting the data and after antenna selection, rather than applying the full-dimensional spatial spreading matrix. That is, the spatial spreading matrix that maps the spatial data streams to the transmit chains is different from, and generally smaller than, the full-dimensional spatial spreading matrix.

Consequently, antenna selection during training is based on the full-dimensional spatial spreading matrix, whereas the actual operation of transmitting the spatial data streams is based on the spatial spreading matrix. The spatial spreading matrix is known only to the transmitter, and not to the receiver which bases its antenna selection on the full-dimensional spatial spreading matrix. Neither the transmitter nor the receiver account for the spatial spreading matrix when the encoded spatial data streams includes a number of spatial data streams that is less than the number of transmit chains. As a result, without accounting for the spatial spreading matrix at the transmitter, antenna selection computation is not accurate. It is therefore desirable to account for the spatial spreading matrix when selecting antennas for transmitting and/or receiving the data transmissions.

SUMMARY

In one embodiment, a method of antenna selection within a communication system having a first transceiver device having transmission antennas and a second transceiver device having receiving antennas is disclosed. The method includes encoding transmission data to produce one or more encoded spatial data streams for transmission via a number of transmitting chains. The number of encoded spatial data streams is different than the number of transmitting chains to be used to transmit the encoded spatial data streams and the number of transmitting chains is less than the number of transmission antennas. The method further includes using a spatial spreading matrix to distribute the one or more encoded spatial data streams to the number of transmission chains. The spatial spreading matrix has components associated with a row dimension having a number of rows equal to the number of transmission chains to be used to transmit the encoded spatial data streams and a column dimension having a number of columns equal to the number of encoded spatial data streams to be transmitted. The method also includes selecting one or more of the transmission antennas to be used to transmit data to the receiving antennas via a channel estimation matrix between the first transceiver device and the second transceiver device. The channel estimation matrix has components associated with a row dimension having a number of rows equal to a number of receiving chains and a column dimension having a number of columns equal to the number of encoded spatial data streams to be transmitted. Selecting the transmission antennas includes accounting for the spatial spreading matrix in the channel estimation matrix.

In another embodiment, a method of antenna selection within a communication system having a first transceiver device having transmission antennas and a second transceiver device having receiving antennas is disclosed. The method includes defining a spatial spreading matrix used to distribute a number of encoded spatial data streams to a number of transmission chains for transmitting the encoded spatial data streams as a first set of columns in a full-dimensional channel spatial spreading matrix. The full-dimensional channel spatial spreading matrix has components associated with a row dimension having a number of rows equal to the number of transmission chains and a column dimension having a number of columns equal to the number of transmission chains, wherein the number of columns in the first set of column in the full-dimensional channel spatial spreading matrix equals the number encoded spatial data streams to be transmitted. The method further includes selecting receiving antennas to be used to receive encoded spatial data streams transmitted through a channel estimation matrix between the first transceiver device and the second transceiver device and to be received via a number of receiving chains. The number of encoded spatial data streams is different than the number of transmitting chains used to transmit the encoded spatial data streams, the number of receiving chains is less than the number of receiving antennas, and selecting receiving antennas includes accounting for the defined spatial spreading matrix.

In yet another embodiment, a method of antenna selection training for a transceiver device having a plurality of antennas is disclosed. The antennas are selected for a data transmission of encoded spatial data streams via a channel estimation matrix having a number of transmitting and receiving chains between transmission antennas and receiving antennas. The method includes searching potential channel sub-matrices within a full-dimensional channel matrix corresponding to a full-dimensional description of the channel between transmission antennas and receiving antennas. The full-dimensional channel matrix has components associated with a row dimension having a number of rows equal to the number of receiving antennas and a column dimension having a number of columns equal to the number of transmission antennas. Each channel sub-matrix has components associated with a row dimension having a number of rows equal to the number of receiving chains to be used to receive the data and a column dimension having a number of columns equal to the number of transmitting chains to be used to transmit the data. The number of encoded spatial data streams is less than the minimum of the number of transmission chains and the number of receiving chains, and the number of receiving chains is less than the number of receiving antennas and/or the number of transmitting chains is less than the number of transmission antennas. The method further includes right-multiplying each potential channel sub-matrix with a spatial spreading matrix to form a corresponding channel sub-matrix having components associated with a row dimension having a number of rows equal to a number of receiving chains and a column dimension having a number of columns equal to the number of encoded spatial data streams to be transmitted. The spatial spreading matrix has components associated with a row dimension having a number of rows equal to the number of transmission chains to be used to transmit the encoded spatial data streams and a column dimension having a number of columns equal to the number of encoded spatial data streams to be transmitted. The method also includes selecting one of the channel sub-matrices based on an optimality criterion, where a channel estimation matrix used to transmit the data from the transmission antennas to the receiving antennas includes the selected channel sub-matrix, and selecting the antennas corresponding to the selected channel sub-matrix.

In a further embodiment, an apparatus within a transmission system having two or more antennas is disclosed. The apparatus includes a spatial spreading calculation unit to produce a spatial spreading matrix to distribute one or more encoded spatial data streams among a number of chains within a chain-to-chain transmission through a channel matrix and a controller coupled to the spatial spreading calculation unit to control the selection of the two or more antennas used in the chain-to-chain transmission using the spatial spreading matrix. The number of encoded spatial data streams is less than the minimum of the number of transmission chains and the number of receiving chains. The channel estimation matrix has components associated with a row dimension having a number of rows equal to a number of receiving chains and a column dimension having a number of columns equal to the number of encoded spatial data streams. The number of transmission chains and/or the number of receiving chains is less than the number of antennas. The spatial spreading matrix has components associated with a row dimension having a number of rows equal to the number of transmission chains used the transmission of the encoded spatial data streams and a column dimension having a number of columns equal to the number of encoded spatial data streams.

DETAILED DESCRIPTION

While the transmission techniques described herein for processing and effecting a wireless data transmission are described as being used in communication systems that use one of the IEEE Standard 802.11(x) communication standards, these techniques may be used in various other types of wireless communication systems and are not limited to those conforming to one or more of the IEEE Standard 802.11(x) standards.

Figure 1:
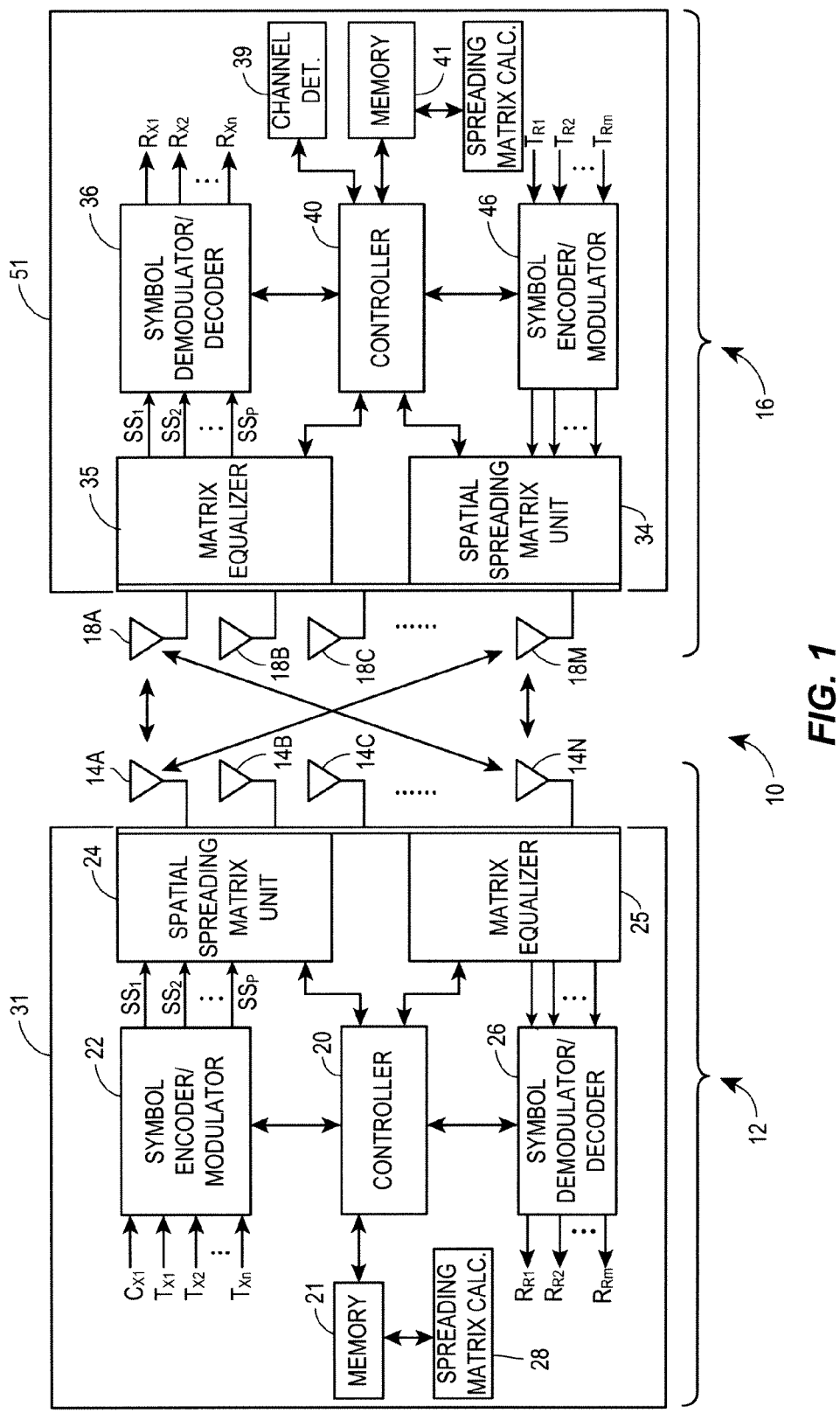
FIG. 1 is a block diagram of a wireless MIMO communication system that determines and uses a spatial spreading matrix to provide for equal power output at all of the transmission antennas of a transmitter.

Referring now to FIG. 1, a MIMO communication system 10 is illustrated in block diagram form as generally including a single transmitter 12 having multiple transmission antennas (or antenna elements) 14A-14N and a single receiver 16 having multiple receiver antennas (or antenna elements) 18A-18M. The number of transmission antennas 14A-14N can be the same as, more than, or less than the number of receiver antennas 18A-18M. As shown in FIG. 1, the transmitter 12 may include a controller 20 coupled to a memory 21, to a symbol encoder and modulator unit 22 and to a spatial spreading block 24. The transmitter 12 may also include a matrix equalizer 25 and a symbol demodulator and decoder unit 26 to perform demodulation and decoding of signals received via the antennas 14A-14N in a receive mode. Additionally, in some instances, the transmitter 12 may include a spreading matrix calculation unit 28.

The controller 12 may be any desired type of controller and the controller 12 and the spreading matrix calculation unit 28 may be implemented as one or more standard multi-purpose, programmable processors, such as micro-processors, as application specific integrated circuits (ASICs), etc., or may be implemented using any other desired types of hardware, software and/or firmware. Likewise, the spatial spreading block 24, and the matrix equalizer 25 may be implemented using known or standard hardware and/or software elements. If desired, various of the transmitter components, such as the controller 20, the modulator unit 22, the demodulator unit 26, the spreading matrix calculation unit 28, the spatial spreading block 24 and the matrix equalizer 25 may be implemented in the same or in different hardware devices, such as in the same or different processors. Additionally, each of these components of the transmitter 12 may be disposed in a housing 31 (shown in dotted relief in FIG. 1) and the routines or instructions for implementing the functionality of any of these components may be stored in the memory 21 or within other memory devices associated with the individual hardware used to implement these components.

Likewise, if desired, one or more pre-calculated or predetermined spatial spreading matrices may be stored in the memory 21 and used in the spatial spreading matrix block 24 at various times or under various different conditions. Thus, for example, a different pre-calculated or predetermined spatial spreading matrix may be stored for each of a number of possible combinations of encoded spatial streams of data to be transmitted and transmission antennas 14 to be used to simultaneously transmit these encoded spatial streams of data. Thus, for example, a different spatial spreading matrix may be calculated and stored for two spatial streams of data being sent via three of the transmission antennas 14, for two spatial streams of data being sent via four of the transmission antennas 14, for three spatial streams of data being sent via five transmission antennas 14, etc. In this manner, the communication system 10 may optimally send different numbers of spatial streams of data at different times, depending on the load of the system. Moreover, the communication system 10 may also use these various different pre-stored or pre-calculated spatial spreading matrices to account for or to adapt to the loss of one or more of the transmission antennas 14 to be used in sending data within the communication system 10.

During operation, information signals $T_{x1}$-$T_{xn}$ which are to be transmitted from the transmitter 12 to the receiver 16 are provided to the symbol encoder and modulator unit 22 for encoding and modulation. Of course, any desired number of signals $T_{x1}$-$T_{xn}$ may be provided to the modulator unit 22, with this number generally being limited by the modulation scheme used by and the bandwidth associated with the MIMO communication system 10. Additionally, the signals $T_{x1}$-$T_{xn}$ may be any type of signals, including analog or digital signals, and may represent any desired type of data or information. Additionally, if desired, a known test or control signal $C_{x1}$ (which may be stored in the memory 21) may be provided to the symbol encoder and modulator unit 22 for use in determining CSI related information describing the characteristics of the channel(s) between the transmitter 12 and the receiver 16. If desired, the same control signal or a different control signal may be used to determine the CSI for each frequency and/or spatial channel used in the MIMO communication system 10.

The symbol encoder and modulator unit 22 may interleave digital representations of the various signals $T_{x1}$-$T_{xn}$ and $C_{x1}$ and may perform any other known type(s) of error-correction encoding on the signals $T_{x1}$-$T_{xn}$ and $C_{x1}$ to produce one or more encoded streams of symbols $SS_1$, $SS_2$, ... $SS_p$, to be modulated and sent from the transmitter 12 to the receiver 16. While the symbol streams $SS_1$-$SS_p$ may be modulated using any desired or suitable QAM technique, such as using 64 QAM, these symbols may be modulated in any other known or desired manner including, for example, using any other desired phase and/or frequency modulation techniques. In any event, the modulated encoded symbol streams $SS_1$-$SS_p$ are provided by the symbol encoder and modulator unit 22 to the spatial spreading block 24 for processing before being transmitted via the antennas 14A-14N. While not specifically shown in FIG. 1, the modulated symbol streams $SS_1$-$SS_p$ may be processed by the spatial spreading block 24 that implements a spatial spreading matrix in accordance with a transmission technique more specifically described below, before being up-converted to the RF carrier frequencies associated with an OFDM technique (in one or more stages). Upon receiving the modulated signals, the spatial spreading block 24 processes the modulated signals by injecting delays and/or gains into the modulated signals based on a spatial spreading matrix which may be calculated by the spreading matrix calculation unit 28, and provided by, for example, the controller 12, to thereby perform mixing and transmission of the spatial streams of data across the transmission antennas 14A-14N and across the transmission chains.

The signals transmitted by the transmitter 12 are received by the receiver antennas 18A-18M and may be processed by a matrix equalizer 35 within the receiver 16 to enhance the reception capabilities of the antennas 18A-18M. As will be understood, the processing applied at the receiver 16 (as well as at the transmitter 12) may be based on, for example, the CSI developed by the receiver 16 in response to the transmission of the test or control signal $C_{x1}$. In particular, a controller 40 or other unit within the receiver 16, such as a channel determination unit 39, may process the received control signal $C_{x1}$ and develop therefrom a measured description of the forward channel between the transmitter 12 and the receiver 16 by determining or characterizing the propagation effects of the forward channel on the signal $C_{x1}$ as it traveled through the forward channel. In any event, a symbol demodulator and decoder unit 36, under control of the controller 40, may decode and demodulate the received symbol strings $SS_1$-$SS_p$ as recovered by the matrix equalizer 35. In this process, these signals may be downconverted to baseband. Generally, the demodulator and decoder unit 36 may operate to remove effects of the forward channel based on the CSI as well as to perform demodulation on the received symbols in each symbol stream $SS_1$-$SS_p$ to produce a digital bit stream for each stream. In some cases, if desired, the symbol demodulator and decoder unit 36 may perform error correction decoding and deinterleaving on the bit stream to produce the received signals $R_{x1}$-$R_{xn}$ corresponding to the originally transmitted signals $T_{x1}$-$T_{xn}$.

As shown in FIG. 1, the receiver 16 may also include a memory 41 and a symbol encoder and modulator unit 46 which may receive one or more signals $T_{R1}$-$T_{Rm}$ encoded and modulated using any desired encoding and modulation techniques. The receiver 16 may also provide one or more known test or control signals $C_{R1}$ to the symbol encoder/modulator unit 46 to be sent to the transmitter 12 to enable the transmitter 12 to determine a measured description of the reverse channel between the receiver 16 and the transmitter 12. The encoded and modulated symbol stream may then be upconverted and processed by a spatial spreading block 34 which may use a spatial spreading matrix developed according to the principles described herein based on the number of symbol streams to be sent simultaneously, the number of receiver and/or transmitter chains to be used, and the number of transmission antennas 18 to be used. The output of the spatial spreading block 34 is then transmitted via the receiver antennas 18A-18N to, for example, the transmitter 12, thereby implementing the reverse link. By implementing the reverse link, the receiver 16 is able to compute not only receiving antenna selection (Rx ASEL), but also transmission antenna selection (Tx ASEL) or joint transmission/receiving antenna selection (TX/Rx ASEL). For Tx ASEL and/or Tx/Rx ASEL operations, the receiver 16 may either feed back the channel state information or compute antenna selection and feed back the selected antenna information in a subsequent transmit opportunity. As shown in FIG. 1, each of the receiver components may be disposed in a housing 51.

The matrix equalizer 25 and the demodulator/decoder unit 26 within the transmitter 12 operate similarly to the matrix equalizer 35 and the demodulator/decoder unit 36 of the receiver 16 to demodulate and decode the symbol streams transmitted by the receiver 16 to produce the recovered signals $R_{R1}$-$R_{Rm}$. Here again, the matrix equalizer 25 may process the received signals in any known manner to enhance the separation and therefore the reception of the various symbol streams transmitted by the antennas 18A-18M. Of course, the CSI or other measured description of the forward channel for the various OFDM channel(s) may be used to process or decode the received signals.

As indicated above, it is desirable to account for the spatial spreading matrix when selecting antennas for transmitting and/or receiving the data transmissions. Typically, when transmitting data between one or more of the transmission antennas 14A-14N and one or more of the receiving antennas 18A-18M in a MIMO transmission system 10, the data is transmitted along one or more receive chains at the receiver, $N_R$, and one or more transmitting chains at the transmitter, $N_T$. In a MIMO-OFDM system, this could be a channel on one subcarrier of the system. Whether in a MIMO or MIMO-OFDM system, or any of number of other types of systems utilizing antenna selection and encoded spatial data streams for that matter, the data streams in the chain-to-chain transmission go through a channel matrix, H. The channel matrix, H, is defined as the full MIMO channel between the transmission antennas 14A-14N and the receiving channels 18A-18M (i.e., a full-dimensional channel matrix) which describes the full-dimensions of the channel between the stations 12, 16. As such, the channel matrix, H, has a row dimension corresponding to the number of receiving antennas, $M_R$, and a column dimension corresponding to the number of transmission antennas, $M_T$, thereby creating an $M_R \times M_T$ matrix. Although referred to herein as the channel matrix, H, it should be understood that the transmitter 12 and receiver 16 may actually use an estimate of the channel matrix, H, based on, for example, sounding information and/or the CSI. Accordingly, as used herein, it should be understood that the channel matrix, H, as used by the transmitter 12 and receiver 16 may be an estimate of the channel matrix, H, as sometimes referred to herein.

Where the number of receive chains, $N_R$, is less than the number of receiving antennas, $M_R$, and/or the number of transmit chains, $N_T$, is less than the number of transmission antennas, $M_T$, the actual matrix channel is a sub-matrix, $H_S$, of the full-dimensional channel matrix, H. Because the channel coefficients corresponding to the different antennas are different, it is important to select the appropriate antennas to transmit and/or receive the transmission. As indicated above, when the number of antennas are larger than the number of chains, the antenna selection is artificial when appropriate antenna selection is not used. Selection of appropriate or most optimal antenna subsets of the available antennas allows for the selection of a subset of available antennas matched to the number of chains, thereby achieving high channel gain. Transmission from the transmitter 12 (Station A) to the receiver 16 (Station B) can be modeled as:

$$y = H_S x + n \qquad \text{(Equ. 1)}$$

where y and n are the received signal vector and additive noise vector at Station B, respectively; $H_S$ is the channel matrix from Station A to Station B, which is a sub-matrix of the full-size channel matrix, H, between Station A and Station B; and x is the signal vector to be transmitted from Station A.

Antenna selection is conducted based on an estimation of the sub-matrix $H_S$. For example, the transmitter 12 (Station A) determines an estimation of $H_S$ based on an estimate of the channel from the receiver 16 (Station B) to Station A, or vice versa. In particular, transmission antenna selection (TX ASEL) is conducted if the number of transmission antennas, $M_T$, is greater than the number of transmit chains, $N_T$, and the number of receiving antennas, $M_R$, is equal to the number of receiving chains, $N_R$. On the other hand, receiving antenna selection (RX ASEL) is conducted if the number of receiving antennas, $M_R$, is greater than the number of receiving chains, $N_R$, and the number of transmission antennas, $M_T$, is equal to the number of transmit chains, $N_T$. Of course, if both the number of transmission antennas, $M_T$, is greater than the number of transmit chains, $N_T$, and the number of receiving antennas, $M_R$, is greater than the number of receiving chains, $N_R$, then joint transmitting and receiving antenna selection is conducted (TX/RX ASEL). As is known, for TX ASEL, the antenna selection computation may be directly conducted at the transmitter 12 or the receiver 16, whereas for RX ASEL, the antenna selection computation is conducted at the receiver 16. As is also known, for joint TX/RX ASEL, the antenna selection may be conducted as the receiver 16.

Regardless of the antenna selection computation (i.e., whether it is TX ASEL, RX ASEL and/or TX/RX ASEL), in order to achieve the desired full channel gain, it is important to know the full-dimensional channel matrix, H. In particular, based on the full-dimensional channel matrix, H, antenna selection may be conducted by selecting the optimal columns and rows from the full-dimensional channel matrix, H. As is known, this may be done based on certain optical criterion, such as channel capacity, substream signal-to-noise ratio, etc. The optimal columns and rows may be selected by conducting antenna selection training, where channel sounding information is send over different antenna subsets using antenna switching. That is, channel sounding information is sent over different subsets of the transmission antennas 14A-14N, where the switch (not shown) switches between the subsets of transmission antennas 14A-14N. Likewise, the sounding information is received over different subsets of the receiving antennas 18A-18M, where the switch (not shown) switches between the subsets of the receiving antennas 18A-18M. For example, in selecting transmission antennas 14A-14N where $M_T = 2N_T$, the full-dimensional channel matrix, H, is equal to the set [H1 H2], where H1 and H2 are the sub-channels with a number of transmission antennas equal to the number of transmit chains, $N_T$ (e.g., H1 is the channel from the first $N_T$ transmission antennas, and H2 is the channel from the second $N_T$ transmission antennas). An example of antenna switching is described in the 802.11n standard and need not be described further herein.

When mapping the one or more encoded spatial data streams of symbols $SS_1, SS_2, \ldots SS_p$, to the transmit chains $N_T$, a spatial spreading (or mapping) matrix, Q, is applied. In this instance, the spatial spreading matrix, Q, is the full-dimensional channel spatial spreading matrix having a row component equal to the number of transmit chains, $N_T$, and a column component also equal to the number of transmit chains, $N_T$, thereby forming an $N_T \times N_T$ matrix. The resulting channel estimation used by the receiver 16 is described as:

$$H1' = H1Q, H2' = H2Q, \ldots, \qquad \text{(Equ. 2)}$$

An example of the full-dimensional spatial spreading matrix, Q, is defined in the IEEE 802.11n standard.

In order for Station B to know the chain-to-chain channels, Station B removes Q and is able to derive H. For example, if the full-dimensional channel spatial spreading matrix Q is an orthogonal matrix, Station B may derive H by applying the transpose conjugate of the matrix, Q, (i.e., $Q^H$), such that in the above example:

$$H = [H1'Q^H, H2'Q^H] \qquad \text{(Equ. 3)}$$

Generally speaking, the full-dimensional spatial spreading matrix, Q, is known by the transmitter 12 (Station A) when conducting antenna selection, because the transmitter applies the full-dimensional spatial spreading matrix, Q, to the transmission in order to map the encoded spatial data streams to the transmit chains. However, because Q also needs to be known by the receiver 16 (Station B) in order to estimate the sub-matrix channel, $H_S$, Q is predefined, so that the receiver 16 may remove the full-dimensional spatial spreading matrix, Q, and derive an estimate of the full-dimensional channel matrix, H, and, in turn, derive the sub-matrix channel, $H_S$, based on previous antenna selection training. That is, Station B is able to determine an estimation of $H_S$ based on an estimate of the full-dimensional channel matrix, H, from Station A to Station B.

However, as also indicated above, in actual data transmission of encoded spatial data streams, the number of spatial data streams, $N_{SS}$, may be less than the number of transmit chains, $N_T$, because it is desirable to transmit all signals from all available transmit chains in order to maximize the channel gain. In such a case, the spatial mapping of the spatial data streams to the transmit chains is performed by applying a spatial spreading matrix, $Q_d$, before transmitting the data and after antenna selection, rather than applying the full-dimensional spatial spreading matrix, Q. The spatial spreading matrix, $Q_d$, has a row dimension corresponding to the number of transmit chains, $N_T$, and a column dimension corresponding to the number of spatial data streams, $N_{SS}$, thereby creating an $N_T \times N_{SS}$ matrix.

Consequently, antenna selection during training is based on the full-dimensional spatial spreading matrix, Q, whereas the actual operation of transmitting the spatial data streams is based on the spatial spreading matrix, $Q_d$. While $Q_d$ may be any arbitrary matrix designed by, and therefore known to, the transmitter 12, $Q_d$ is unknown to the receiver 16, which bases its antenna selection on the full-dimensional spatial spreading matrix, Q. As a result, without knowledge of $Q_d$, the previously performed antenna selection computation is not accurate.

Typically, $Q_d$ is not an identity matrix, because in the above case some of the $N_T$-$N_{SS}$ transmit chains will be switched off and the transmission power level will be reduced. That is, the $N_T$ transmit chains are connected by the previously selected transmission antennas. If $Q_d$ is an identify matrix, then $Q_d$ does not need to be known and is essentially equal to nothing. Further, $Q_d$ is applicable when the number of spatial data streams, $N_{SS}$ is less than the minimum of the transmit chains, $N_T$, and the receiving chains, $N_R$ (i.e., $N_{SS}<\min(N_T, N_R)$). If the number of spatial data streams is equal to the minimum of the transmit chains, $N_T$, and the receiving chains, $N_R$ (i.e., $N_{SS}=\min(N_T, N_R)$), then the number of spatial data streams is equal to the upper limits of the MIMO channel, because the number of spatial data streams reaches the saturation point of the actual matrix channel, $H_S$, which is an $N_R \times N_T$ matrix. That is, in such a channel matrix, the maximum number of spatial data streams that can be transmitted is the minimum of $N_T$, $N_R$.

In order to obtain accurate antenna selection computation when the number of spatial data streams, $N_{SS}$, is less than the minimum of the transmit chains, $N_T$, and the receiving chains, $N_R$, the spatial mapping matrix, $Q_d$, used to map the spatial data streams to the transmit chains is used for antenna selection training at the transmitter 12 and/or receiver 16. That is, antenna selection computation accounts for $Q_d$. Further, in order for the receiver 16 to accurately select receiving antennas, $Q_d$ is predefined and known by the receiver 16. In one example described further below, $Q_d$ may be predefined as part of the wireless protocol utilized by the transmitter 12 and receiver 16, such as the 802.11n standard or subsequent 802.11(x) standards.

When computing the antenna selection based on the spatial mapping matrix, $Q_d$, it is assumed that the station (Station A or B) conducting the antenna selection computation knows that $Q_d$ will be applied at the transmitter 12, in which case the station also knows the number of spatial data streams, $N_{SS}$. As indicated above, if the number of spatial data streams is equal to the minimum of the transmit chains, $N_T$, and the receiving chains, $N_R$, then antenna selection may be conducted using conventional techniques. The antenna selection example described below is based on the situation where the number of spatial data streams is less than the minimum of the transmit chains, $N_T$, and the receiving chains, $N_R$, in which case the antenna selection accounts for the spatial spreading matrix, $Q_d$.

Beginning with the full-dimensional channel matrix, H, the station conducting the antenna selection searches over all different combinations of sub-matrices, $H_S$, of size $N_R \times N_T$ within the full-dimensional channel matrix, H. Each different combination of $H_S$ is denoted as H1, H2, ..., Hk, where k is the number of all possible sub-matrices of size $N_R \times N_T$ within the full-dimensional channel matrix, H.

Optionally, each of the sub-matrices may be right-multiplied by the spatial spreading matrix, $Q_d$, to form channel estimation sub-matrices corresponding to each of the sub-matrices H1-Hk. For example, the channel estimation sub-matrices may be denoted as:

$$H1'=H1Q_d, H2'=H2Q_d, \ldots, Hk'=HkQ_d \qquad \text{(Equ. 4)}$$

However, when antenna selection channel training is over all possible sub-matrices of the full-dimensional channel matrix, H, and when the spatial spreading matrix, $Q_d$, is the first set of columns in the full-dimensional spatial spreading matrix, Q, corresponding to the number of spatial data streams, $N_{SS}$, (i.e., the first $N_{SS}$ columns of Q), then right-multiplying with $Q_d$ is not needed in order to determine the full-dimensional channel matrix, H, and antenna selection computation may be conducted directly.

Whether or not each sub-matrix is multiplied by $Q_d$, the best channel sub-matrix is selected based on certain criteria, such as a set of optimality criterion (e.g., channel capacity, substream signal-to-noise ratio, etc.) which may be the same as that used to determine the full-dimensional spatial spreading matrix, Q, as indicated above. That is:

$$k_{opt} = \underset{k}{\operatorname{argmax}}(C_{H_k}) \qquad \text{(Equ. 5)}$$

where the selected channel sub-matrix is $H_S = H_{k_{opt}}$ (i.e., the maximum of the selected optimality criterion).

In one example, selecting one of the channel estimation sub-matrices, H1'-Hk' may include developing a steering matrix for each channel estimation sub-matrix and applying each steering matrix to the corresponding channel estimation sub-matrix. Once the steering matrix has been applied, the spatial spreading matrix, $Q_d$, is applied to each channel estimation sub-matrix. In particular with transmitter antenna selection computation, the transmitter should apply advanced schemes, such as beamforming and steering matrix application, before applying the spatial spreading matrix, $Q_d$, to each channel estimation sub-matrix. This is because the nature of such schemes tend to change the spatial mapping, and when the transmitter changes the spatial mapping (i.e., changes $Q_d$), antenna selection performance gain may suffer due to the previous antenna selection results no longer being accurate or applicable to the new $Q_d$.

Once the spatial spreading matrix has been applied to each channel sub-matrix, the test signals are transmitted from Station A to Station B using the test steering matrices and the spatial spreading matrix. From these transmissions, a quality factor may be determined for each of the test signals and returned back from the receiver 16 to the transmitter 12. Using the quality factors, the optimal channel estimation sub-matrix may be selected, and the antennas corresponding to the selected channel estimation sub-matrix may be selected.

As a result of the above antenna selection computation, all possible sub-matrices within the full-dimensional channel matrix, H, are trained. This means that all possible combinations of antennas are trained using the spatial spreading matrix, $Q_d$. As will be understood, there may be different ways to account for $Q_d$ during antenna selection computation, of which the above is only an example. As will also be understood, the above antenna selection computation may be applied to transmission antenna selection at the transmitter 12, transmission antenna selection at the receiver 16, receiver antenna selection as the receiver 16 and joint transmission/receiving antenna selection at either the transmitter 12 or receiver 16.

As indicated above, antenna selection computation may always be conducted at the transmitter 12 with the spatial spreading matrix, $Q_d$, known, given that the transmitter 12 applies the spatial spreading matrix to map the spatial data streams to the transmit chains. However, where antenna selection computation is conducted at the receiver 16, the spatial spreading matrix, $Q_d$, along with the full-dimensional spatial spreading matrix, Q, should be pre-defined, preferably in the communication standard being used between the transmitter 12 and receiver 16 (e.g., IEEE 802.11n). If the spatial spreading matrix, $Q_d$, is predefined for the receiver 16, the receiver 16 is able to conduct antenna selection computation based on the full-dimensional channel matrix, H, and based on $Q_d$.

Accordingly, it is preferred to have the spatial spreading matrix equal to the first set of column of the full-dimensional spatial spreading matrix, Q, corresponding to the number of spatial data streams, $N_{SS}$. That is, $Q_d$ is the first $N_{SS}$ column of Q:

$$Q_d = Q(:,1:N_{SS}) \qquad \text{(Equ. 5)}$$

As such, in order to achieve the best performance in the antenna selection, the receiver 16 should compute the antenna selection based on the assumption that the first $N_{SS}$ columns in the full-dimensional spatial spreading matrix, Q, will be applied at the transmitter 12 for data transmission after antenna selection switching. An additional factor in achieving the best performance has the transmitter 12 applying the first $N_{SS}$ column in the full-dimensional spatial spreading matrix, Q for spatial mapping (i.e., $Q_d$) for data transmission after antenna selection switching.

Some example antenna selection computations and the results thereof using spatial spreading matrices derived from the above-described techniques are provided below for a 4×2 chain system used to simultaneously send one spatial stream (four receive chains and two transmit chains in a 4×4 antenna system), a 4×3 chain system used to simultaneously send two spatial streams (four receive chains and three transmit chains in a 4×4 antenna system), a 4×3 chain system used to simultaneously send three spatial streams (four receive chains and three transmit chains in a 4×4 antenna system), 2×2 chain system used to simultaneously send one spatial stream (two receive chains and two transmit chains in a 4×2 antenna system), and a 3×3 chain system used to simultaneously send two spatial streams (three receive chains and three transmit chains in a 4×3 antenna system), all with a signal-to-noise ratio of 20 dB, a Rayleigh fading channel and 10000 simulated samples. In corresponding FIGS. 2A-2E, the channel strengths or channel capacity (as indicated) of the equivalent channel estimation matrix are plotted with respect to the cumulative density function (CDF) of the post-processing channel gain at the receiver corresponding to different antenna selection strategies. Channel capacity is plotted in some instances, because channel capacity is a better indicator of quality than channel strength. The probability that y is smaller than x is provided as:

$$f_y(x) = Pr[y \leq x] \qquad \text{(Equ. 6)}$$

where y is a random variable. The CDF curves on the right of the plots shown in FIGS. 2A-2E imply a higher possible realization of the random variable (i.e., higher post-processing channel gain). In the examples, the full-dimensional spatial spreading matrix, Q, is orthogonal for purposes of the examples only. In particular, an orthogonal matrix is easy to remove by multiplying the transpose conjugate of the matrix to obtain the identity matrix, rather than performing matrix inversion, though it should be understood that the full-dimensional spatial spreading matrix, Q, need not be orthogonal in all instances.

Figure 2A:
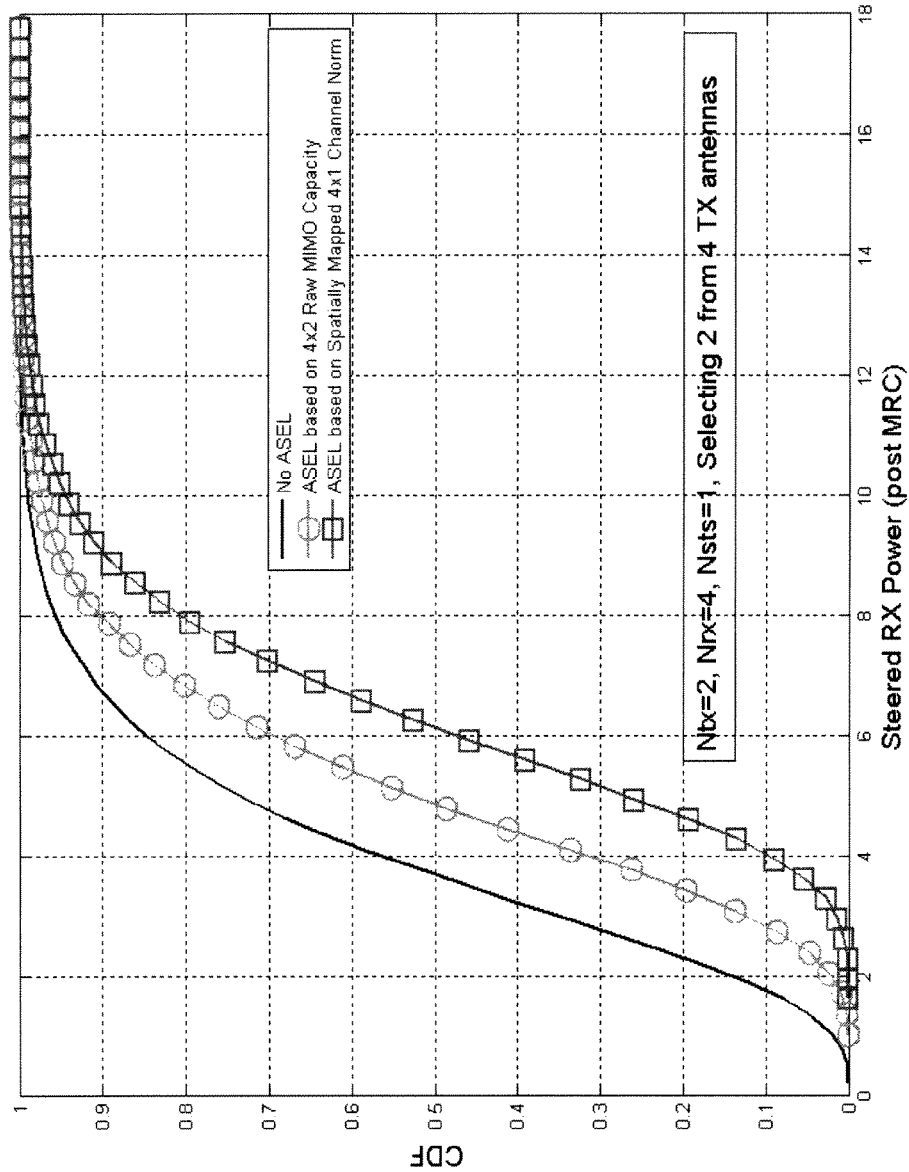
FIGS. 2A-2E illustrate examples of the antenna selection and training techniques as used with various antenna selections and spatial streams.

Referring to FIG. 2A, the number of receive chains, $N_R$, is equal to the number of receiving antennas, $M_R$, (i.e., $M_R=N_R=4$), the number of transmit chains, $N_T$, is less than the number of transmission antennas, $M_T$, (i.e., $M_T=4$, $N_T=2$), and the number of spatial data streams, $N_{SS}$, is two, thereby resulting in a 2/4 transmitter antenna selection. In this case a full-dimensional spatial spreading matrix, Q, is provided as:

$$Q = \frac{1}{\sqrt{2}}\begin{bmatrix} 1 & 1 \\ 1 & -1 \end{bmatrix}$$

With $N_{SS}=1$, $N_{SS}<\min(N_T, N_R)$:

$$Q_d = \frac{1}{\sqrt{2}}\begin{bmatrix} 1 \\ 1 \end{bmatrix}$$

As seen from FIG. 2A, no antenna selection, denoted by the straight line plot, results in the least amount of gain, whereas antenna selection based on the full-dimensional spatial spreading matrix, Q, and the full-dimensional channel matrix, H, denoted by the circle line plot, has a limited gain as compared to no antenna selection, and the most optimal antenna selection based on the spatial spreading matrix, $Q_d$, and the channel sub-matrix, $H_S$, denoted by the square line plot, results in the best gain.

Figure 2B:
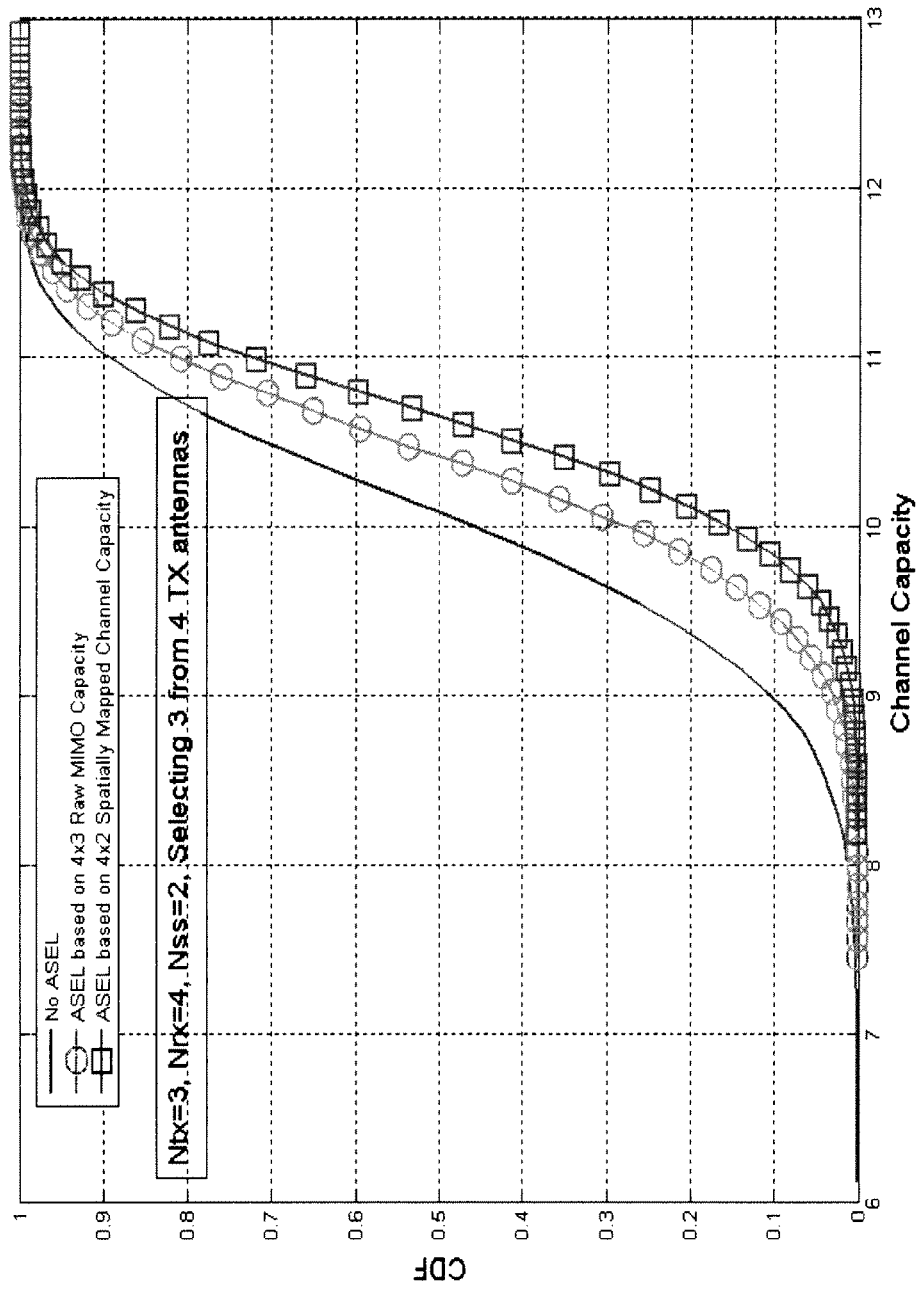

Referring to FIG. 2B, $M_R=N_R=4$, $M_T=4$, $N_T=3$, and $N_{SS}=2$, thereby resulting in a 3/4 transmitter antenna selection. In this case a full-dimensional spatial spreading matrix, Q, is provided as:

$$Q = \frac{1}{\sqrt{3}}\begin{bmatrix} 1 & 1 & 1 \\ 1 & e^{j2\pi/3} & e^{j4\pi/3} \\ 1 & e^{j4\pi/3} & e^{j2\pi/3} \end{bmatrix}$$

With $N_{SS}=2$, $N_{SS}<\min(N_T, N_R)$, $$Q_d = \frac{1}{\sqrt{3}}\begin{bmatrix} 1 & 1 \\ 1 & e^{j2\pi/3} \\ 1 & e^{j4\pi/3} \end{bmatrix}$$

As seen from FIG. 2B, again no antenna selection results in the least amount of gain, whereas antenna selection based on the full-dimensional spatial spreading matrix, Q, and full-dimensional channel matrix, H, has a limited gain as compared to no antenna selection, and the most optimal antenna selection based on the spatial spreading matrix, $Q_d$, and the channel sub-matrix, Hs, results in the best gain.

Figure 2C:
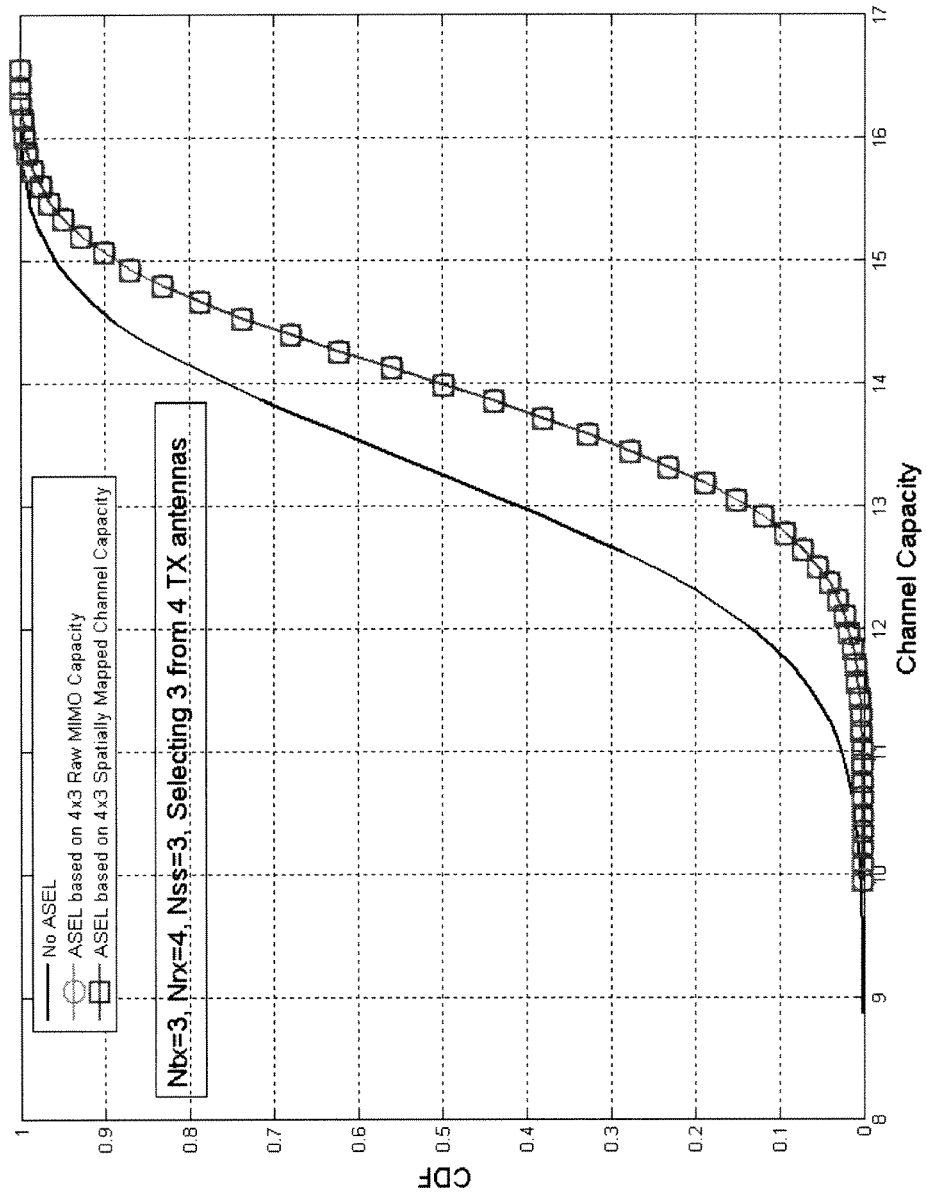

Referring to FIG. 2C, $M_R=N_R=4$, $M_T=4$, $N_T=3$, and $N_{SS}=3$, thereby resulting in a 3/4 transmitter antenna selection. In this case a full-dimensional spatial spreading matrix, Q, is provided as:

$$Q = \frac{1}{\sqrt{3}}\begin{bmatrix} 1 & 1 & 1 \\ 1 & e^{j2\pi/3} & e^{j4\pi/3} \\ 1 & e^{j4\pi/3} & e^{j2\pi/3} \end{bmatrix}$$

With $N_{SS}=3$, $N_{SS}=\min(N_T, N_R)$, so $Q_d=Q$, because the number of spatial data streams is equal to the upper limit of the MIMO channel. That is, the actual MIMO channel after antenna selection is 3×4, so the most spatial data streams that can be transmitted is three. As seen from FIG. 2C, no antenna selection results in the least amount of gain, whereas antenna selection based on the full-dimensional spatial spreading matrix, Q, and full-dimensional channel matrix, H, has the same performance as the most optimal antenna selection based on the spatial spreading matrix, $Q_d$, and the channel sub-matrix, $H_S$, because $Q=Q_d$.

Figure 2D:
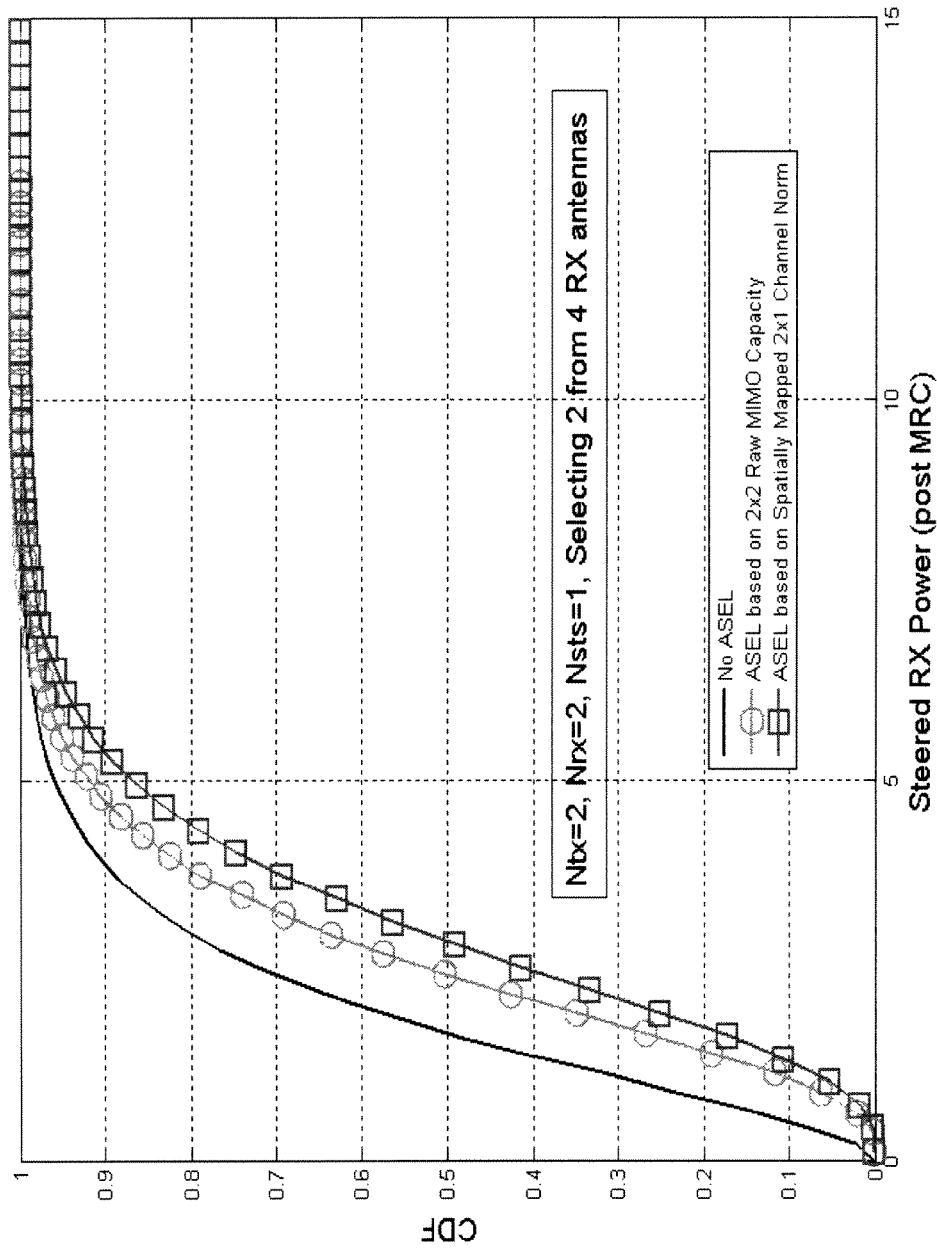

Referring to FIG. 2D, $M_R=4$, $N_R=2$, $M_T=N_T=2$, and $N_{SS}=1$, thereby resulting in a 2/4 receiver antenna selection. In this case a full-dimensional spatial spreading matrix, Q, is provided as:

$$Q = \frac{1}{\sqrt{2}}\begin{bmatrix} 1 & 1 \\ 1 & -1 \end{bmatrix}$$

With $N_{SS}=1$, $N_{SS}<\min(N_T, N_R)$:

$$Q_d = \frac{1}{\sqrt{2}}\begin{bmatrix} 1 \\ 1 \end{bmatrix}$$

As seen from FIG. 2D, no antenna selection results in the least amount of gain, whereas antenna selection based on the full-dimensional spatial spreading matrix, Q, and full-dimensional channel matrix, H, has a limited gain as compared to no antenna selection, and the most optimal antenna selection based on the spatial spreading matrix, $Q_d$, and the channel sub-matrix, $H_S$, still results in the best gain.

Figure 2E:
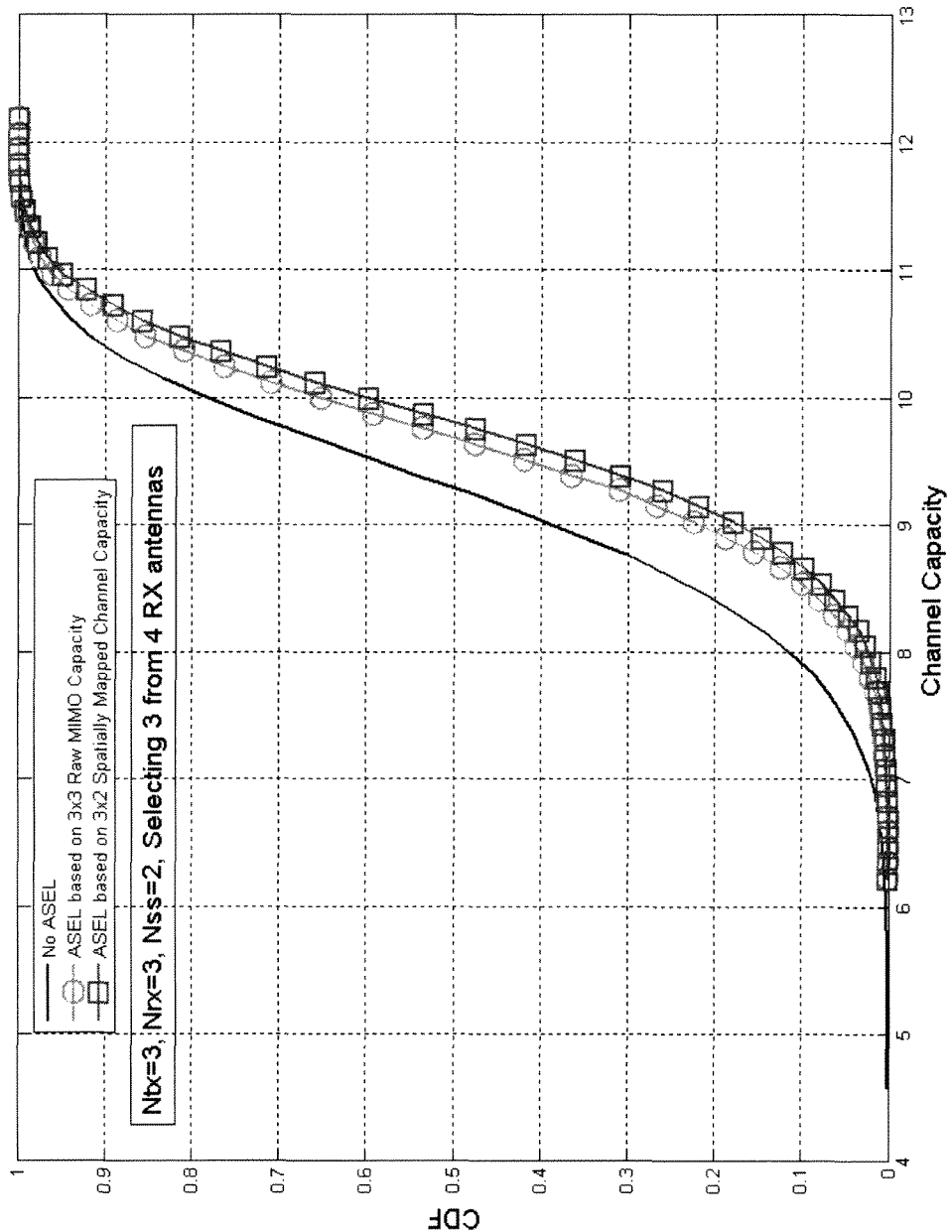

Referring to FIG. 2E, $M_R=4$, $N_R=3$, $M_T=N_T=3$, and $N_{SS}=2$, thereby resulting in a 3/4 receiver antenna selection. In this case a full-dimensional spatial spreading matrix, Q, is provided as:

$$Q = \frac{1}{\sqrt{3}}\begin{bmatrix} 1 & 1 & 1 \\ 1 & e^{j2\pi/3} & e^{j4\pi/3} \\ 1 & e^{j4\pi/3} & e^{j2\pi/3} \end{bmatrix}$$

With $N_{SS}=2$, $N_{SS}<\min(N_T, N_R)$, $$Q_d = \frac{1}{\sqrt{3}}\begin{bmatrix} 1 & 1 \\ 1 & e^{j2\pi/3} \\ 1 & e^{j4\pi/3} \end{bmatrix}$$

As seen from FIG. 2E, once again no antenna selection results in the least amount of gain, antenna selection based on the full-dimensional spatial spreading matrix, Q, and full-dimensional channel matrix, H, has a limited gain, and the most optimal antenna selection based on the spatial spreading matrix, $Q_d$, and the channel sub-matrix, $H_S$, results in the best gain.

As will be understood, the manner in which the spatial spreading matrix, $Q_d$, is calculated or determined is not particularly important. Thus, any mathematical, heuristic, iterative, or trial and error method can be used to actually determine or compute any particular size of spatial spreading matrix, and the method used to compute a spatial spreading matrix is not determinative. Moreover, the specific orientation or definition of the "row" and "column" dimensions of a matrix as used herein is arbitrary and is simply based on convention, and therefore may be changed. Thus, for example, the row dimension can be a horizontal dimension with the column dimension being a vertical dimension (as assumed herein), or the row dimension can be a vertical dimension with the column dimension being a horizontal dimension.

Moreover, it will be understood that the actual spatial spreading matrix equations, e.g., the computation of a particular spatial spreading matrix that satisfies the constraints defined above, may be performed at any desired location within the wireless communication system 10 of FIG. 1, including within the controller 20 or other hardware, software, or firmware of the transmitter 12, as well as within the controller 40 or other hardware, software, or firmware of the receiver 16. Alternatively, the spatial spreading matrix may be pre-computed and stored in the memory 21 (or 41) or other memory of the system 10 prior to the transmission system being used. The spatial spreading matrix or matrices may also be computed or determine by a different device and may be sent to the transmitter 12 or the receiver 14 of the transmission system 10 at any desired time.

Of course, the spatial spreading matrix technique described herein is not limited to being used in a transmitter of a MIMO communication system communicating with a single receiver of the MIMO communication system, but can additionally be applied when a transmitter of a MIMO communication system is communicating with multiple receivers, each of which has one or more receiver antennas associated therewith.

While the spatial spreading matrix calculations described herein are described in one example as being implemented in software stored in, for example, one of the memories 21, 41 and implemented on a processor associated with one of the controllers 20, 40, or with the spatial spreading matrix calculation unit 28 of the MIMO communication system 10 of FIG. 1, these routines may alternatively or additionally be implemented in digital or analog hardware, firmware, application specific integrated circuits, etc., as desired. If implemented in software, the routines may be stored in any computer readable memory such as in RAM, ROM, flash memory, a magnetic disk, a laser disk, or other storage medium. Likewise, this software may be delivered to a MIMO system device (such as a transmitter or a receiver) via any known or desired delivery method including, for example, over a communication channel such as a telephone line, the Internet, a wireless connection, etc., or via a transportable medium, such as a computer-readable disk, flash drive, etc.

The above antenna selection and training techniques may be embodied in any type of wireless communication system including, for example, ones used in wireless computer systems such as those implemented via a local area network or a wide area network, internet, cable and satellite based communication systems (such as internet, data, video and voice communication systems), wireless telephone systems (including cellular phone systems, voice over internet protocol (VoIP) systems, home-based wireless telephone systems, etc.) Referring now to FIGS. 3A-3H, various exemplary implementations of the antenna selection and training techniques are shown.

Figure 3A:
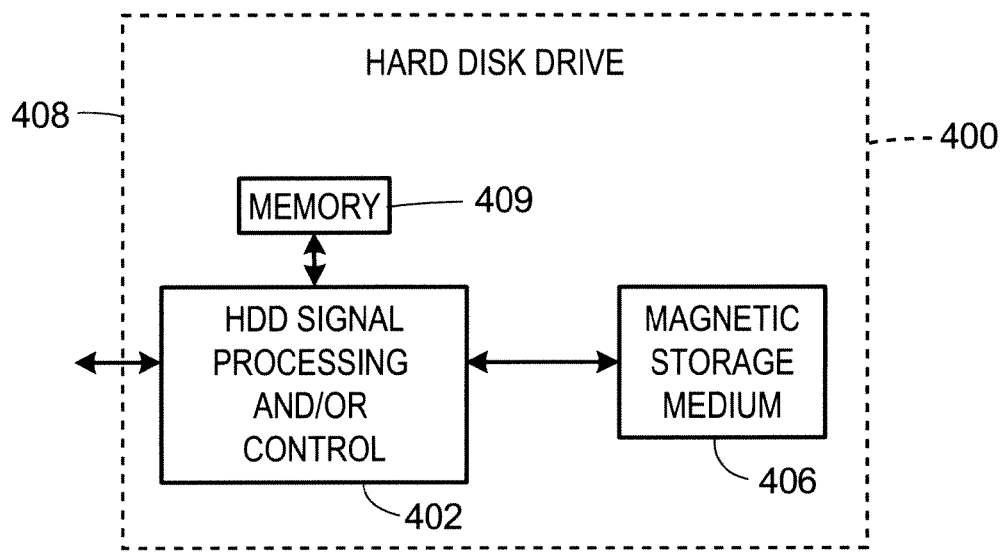
FIGS. 3A-3H illustrate examples of various different devices in which a wireless communication system implementing the antenna selection and training techniques described herein may be used.

Referring to FIG. 3A, the antenna selection and training techniques may be used with a hard disk drive 400 which includes both signal processing and/or control circuits, which are generally identified in FIG. 3A at 402. In some implementations, signal processing and/or control circuit 402 and/or other circuits (not shown) in HDD 400 may process data, perform coding and/or encryption, perform calculations, and/or format data that is output to and/or received from a magnetic storage medium 406.

HDD 400 may communicate with a host device (not shown) such as a computer, mobile computing devices such as personal digital assistants, cellular phones, media or MP3 players and the like, and/or other devices via one or more wired or wireless communication links 408 which may implement the antenna selection and training techniques described above. HDD 400 may be connected to memory 409, such as a random access memory (RAM), a low latency nonvolatile memory such as flash memory, read only memory (ROM) and/or other suitable electronic data storage.

Figure 3B:
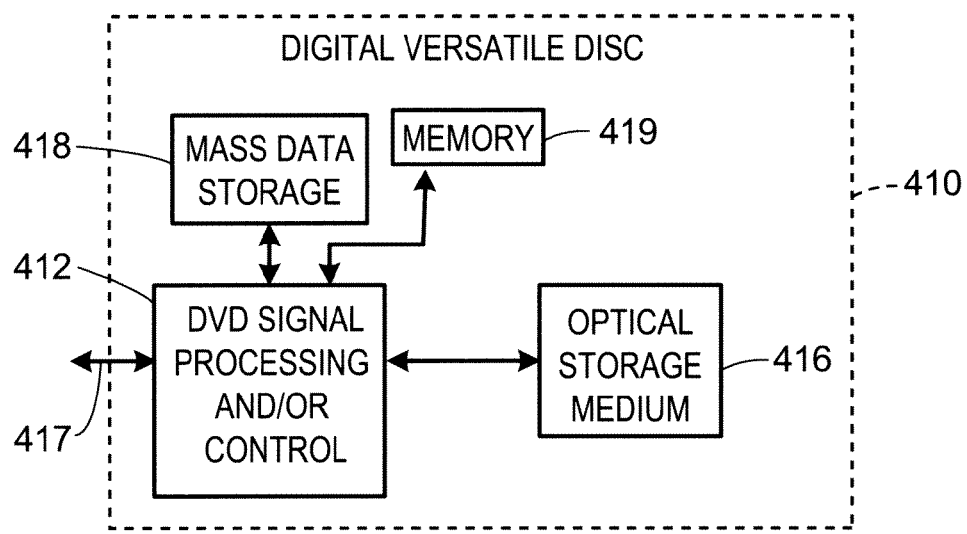

Referring now to FIG. 3B, the antenna selection and training techniques may be embodied in or used with a digital versatile disc (DVD) drive 410 which may include either or both signal processing and/or control circuits, which are generally identified in FIG. 3B at 412, and/or mass data storage 418 of DVD drive 410. Signal processing and/or control circuit 412 and/or other circuits (not shown) in DVD 410 may process data, perform coding and/or encryption, perform calculations, and/or format data that is read from and/or data written to an optical storage medium 416. In some implementations, signal processing and/or control circuit 412 and/or other circuits (not shown) in DVD 410 can also perform other functions such as encoding and/or decoding and/or any other signal processing functions associated with a DVD drive.

DVD drive 410 may communicate with an output device (not shown) such as a computer, television or other device via one or more wired or wireless communication links 417 which may be implemented using the antenna selection and training techniques described above. DVD 410 may communicate with mass data storage 418 that stores data in a nonvolatile manner. Mass data storage 418 may include a hard disk drive (HDD) such as that shown in FIG. 3A. The HDD may be a mini HDD that includes one or more platters having a diameter that is smaller than approximately 1.8". DVD 410 may be connected to memory 419, such as RAM, ROM, low latency nonvolatile memory such as flash memory, and/or other suitable electronic data storage.

Figure 3C:
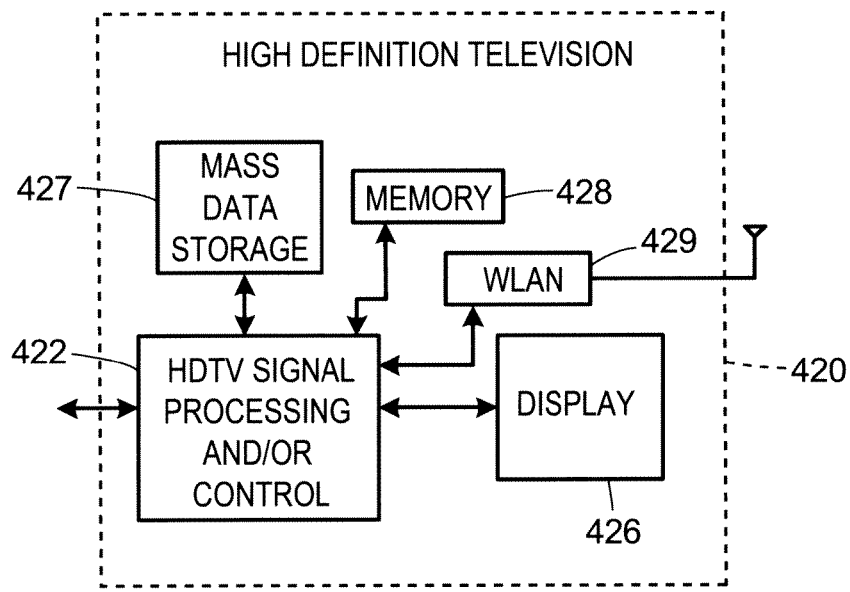

Referring now to FIG. 3C, the antenna selection and training techniques may be embodied in a high definition television (HDTV) 420 which may include either or both signal processing and/or control circuits, which are generally identified in FIG. 3C at 422, a WLAN interface and/or mass data storage of the HDTV 420. HDTV 420 receives HDTV input signals in either a wired or wireless format and generates HDTV output signals for a display 426. In some implementations, signal processing circuit and/or control circuit 422 and/or other circuits (not shown) of HDTV 420 may process data, perform coding and/or encryption, perform calculations, format data and/or perform any other type of HDTV processing that may be required.

HDTV 420 may communicate with mass data storage 427 that stores data in a nonvolatile manner such as optical and/or magnetic storage devices. At least one HDD may have the configuration shown in FIG. 3A and/or at least one DVD may have the configuration shown in FIG. 3B. The HDD may be a mini HDD that includes one or more platters having a diameter that is smaller than approximately 1.8". HDTV 420 may be connected to memory 428 such as RAM, ROM, low latency nonvolatile memory such as flash memory and/or other suitable electronic data storage. HDTV 420 also may support connections with a WLAN via a WLAN network interface 429 which may implement the beamforming techniques described above.

Figure 3D:
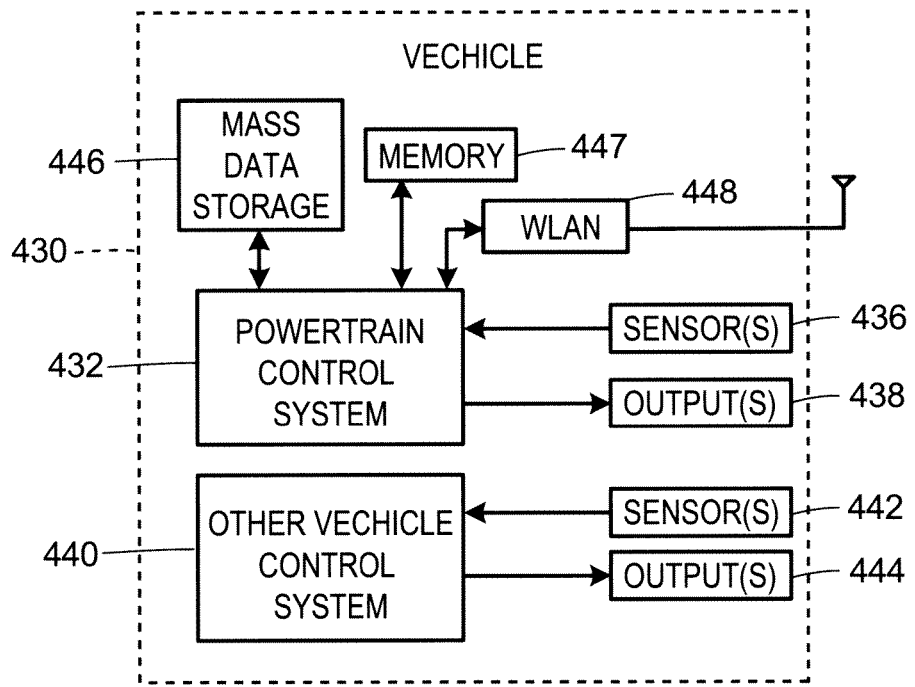

Referring now to FIG. 3D, the antenna selection and training techniques may be used in conjunction with a control system of a vehicle 430 having a WLAN interface and/or mass data storage. In some implementations, the antenna selection and training techniques may be used within a powertrain control system 432 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The antenna selection and training techniques may also be embodied in other control systems 440 of vehicle 430. Control system 440 may likewise receive signals from input sensors 442 and/or output control signals to one or more output devices 444. In some implementations, control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 432 may communicate with mass data storage 446 that stores data in a nonvolatile manner. Mass data storage 446 may include optical and/or magnetic storage devices for example hard disk drives HDD and/or DVDs. At least one HDD may have the configuration shown in FIG. 3A and/or at least one DVD may have the configuration shown in FIG. 3B. The HDD may be a mini HDD that includes one or more platters having a diameter that is smaller than approximately 1.8". Powertrain control system 432 may be connected to memory 447 such as RAM, ROM, low latency nonvolatile memory such as flash memory and/or other suitable electronic data storage. Powertrain control system 432 also may support connections with a WLAN via a WLAN network interface 448 which may implement the antenna selection and training techniques described above. The control system 440 may also include mass data storage, memory and/or a WLAN interface (all not shown).

Figure 3E:
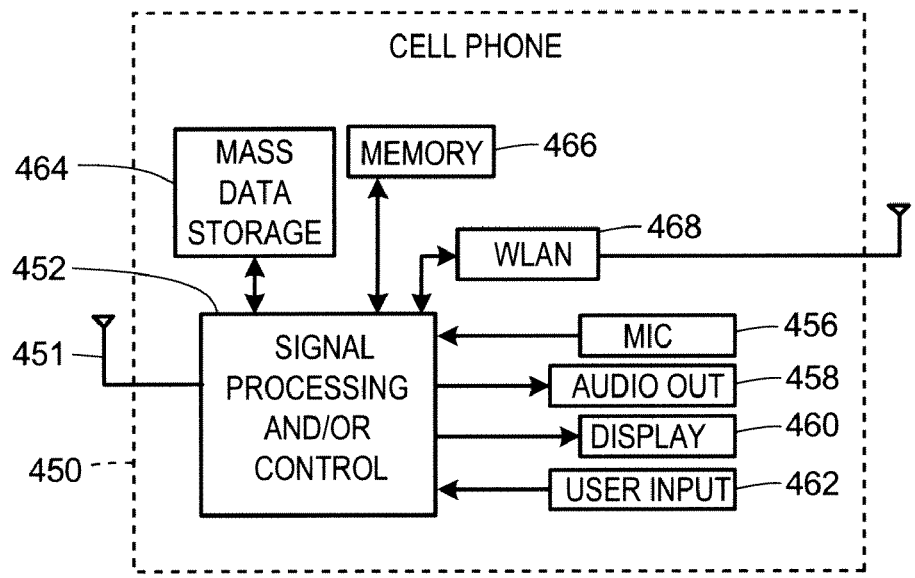

Referring now to FIG. 3E, the antenna selection and training techniques may be embodied in a cellular phone 450 that may include one or more cellular antennas 451, either or both signal processing and/or control circuits, which are generally identified in FIG. 3E at 452, a WLAN interface and/or mass data storage of the cellular phone 450. In some implementations, cellular phone 450 includes a microphone 456, an audio output 458 such as a speaker and/or audio output jack, a display 460 and/or an input device 462 such as a keypad, pointing device, voice actuation and/or other input device. Signal processing and/or control circuits 452 and/or other circuits (not shown) in cellular phone 450 may process data, perform coding and/or encryption, perform calculations, format data and/or perform other cellular phone functions.

Cellular phone 450 may communicate with mass data storage 464 that stores data in a nonvolatile manner such as optical and/or magnetic storage devices for example hard disk drives HDD and/or DVDs. At least one HDD may have the configuration shown in FIG. 3A and/or at least one DVD may have the configuration shown in FIG. 3B. The HDD may be a mini HDD that includes one or more platters having a diameter that is smaller than approximately 1.8". Cellular phone 450 may be connected to memory 466 such as RAM, ROM, low latency nonvolatile memory such as flash memory and/or other suitable electronic data storage. Cellular phone 450 also may support connections with a WLAN via a WLAN network interface 468.

Figure 3F:
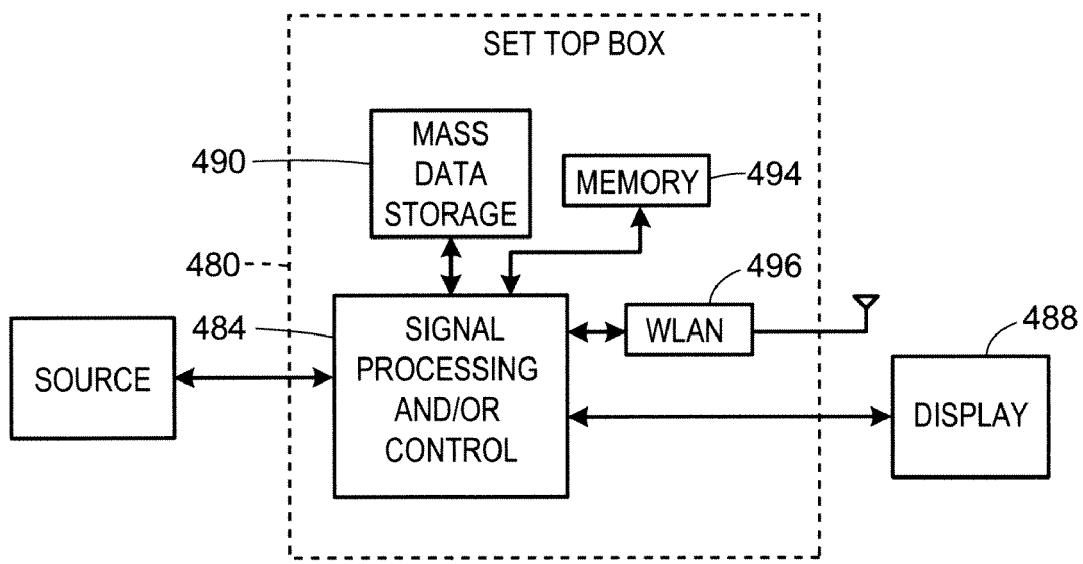

Referring now to FIG. 3F, the antenna selection and training techniques may be embodied in a set top box 480 including either or both signal processing and/or control circuits, which are generally identified in FIG. 3F at 484, a WLAN interface and/or mass data storage of the set top box 480. Set top box 480 receives signals from a source such as a broadband source and outputs standard and/or high definition audio/video signals suitable for a display 488 such as a television and/or monitor and/or other video and/or audio output devices. Signal processing and/or control circuits 484 and/or other circuits (not shown) of the set top box 480 may process data, perform coding and/or encryption, perform calculations, format data and/or perform any other set top box function.

Set top box 480 may communicate with mass data storage 490 that stores data in a nonvolatile manner. Mass data storage 490 may include optical and/or magnetic storage devices for example hard disk drives HDD and/or DVDs. At least one HDD may have the configuration shown in FIG. 3A and/or at least one DVD may have the configuration shown in FIG. 3B. The HDD may be a mini HDD that includes one or more platters having a diameter that is smaller than approximately 1.8". Set top box 480 may be connected to memory 494 such as RAM, ROM, low latency nonvolatile memory such as flash memory and/or other suitable electronic data storage. Set top box 480 also may support connections with a WLAN via a WLAN network interface 496 which may implement the antenna selection and training techniques described herein.

Figure 3G:
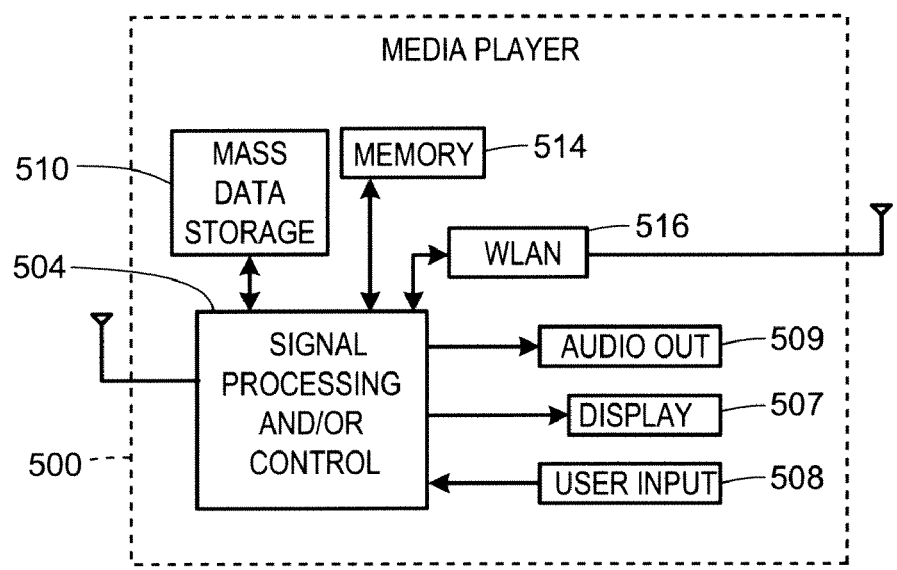

Referring now to FIG. 3G, the antenna selection and training techniques may be embodied in a media player 500. The antenna selection and training techniques may implement either or both signal processing and/or control circuits, which are generally identified in FIG. 3G at 504, a WLAN interface and/or mass data storage of the media player 500. In some implementations, media player 500 includes a display 507 and/or a user input 508 such as a keypad, touchpad and the like. In some implementations, media player 500 may employ a graphical user interface (GUI) that typically employs menus, drop down menus, icons and/or a point-and-click interface via display 507 and/or user input 508. Media player 500 further includes an audio output 509 such as a speaker and/or audio output jack. Signal processing and/or control circuits 504 and/or other circuits (not shown) of media player 500 may process data, perform coding and/or encryption, perform calculations, format data and/or perform any other media player function.

Media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 3A and/or at least one DVD may have the configuration shown in FIG. 3B. The HDD may be a mini HDD that includes one or more platters having a diameter that is smaller than approximately 1.8". Media player 500 may be connected to memory 514 such as RAM, ROM, low latency nonvolatile memory such as flash memory and/or other suitable electronic data storage. Media player 500 also may support connections with a WLAN via a WLAN network interface 516 which may implement the antenna selection and training techniques described herein. Still other implementations in addition to those described above are contemplated.

Figure 3H:
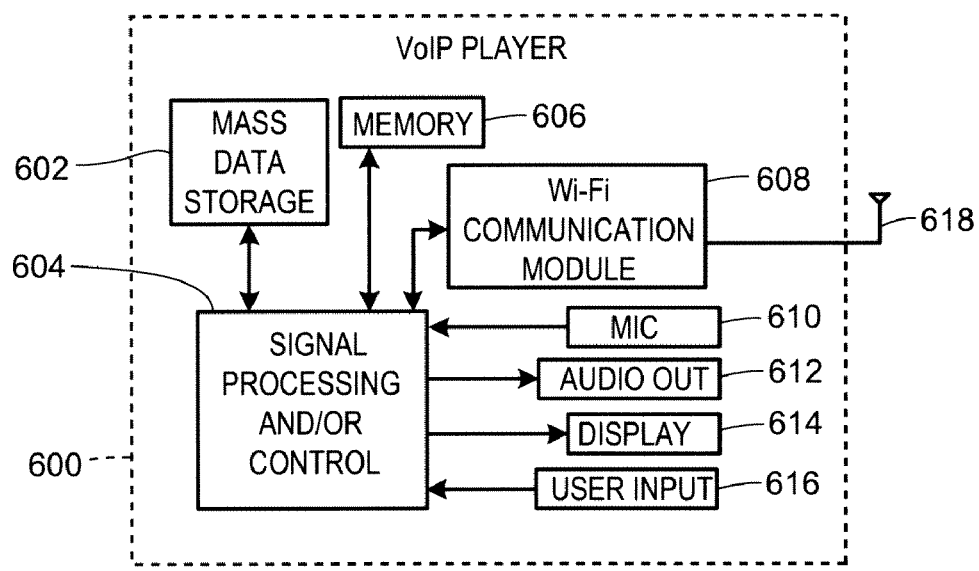

Referring to FIG. 3H, the antenna selection and training techniques may be embodied in a Voice over Internet Protocol (VoIP) phone 600 that may include one or more antennas 618, either or both signal processing and/or control circuits, which are generally identified in FIG. 3H at 604, and a wireless interface and/or mass data storage of the VoIP phone 600. In some implementations, VoIP phone 600 includes, in part, a microphone 610, an audio output 612 such as a speaker and/or audio output jack, a display monitor 614, an input device 616 such as a keypad, pointing device, voice actuation and/or other input devices, and a Wireless Fidelity (Wi-Fi) communication module 608. Signal processing and/or control circuits 604 and/or other circuits (not shown) in VoIP phone 600 may process data, perform coding and/or encryption, perform calculations, format data and/or perform other VoIP phone functions.

VoIP phone 600 may communicate with mass data storage 602 that stores data in a nonvolatile manner such as optical and/or magnetic storage devices, for example hard disk drives HDD and/or DVDs. At least one HDD may have the configuration shown in FIG. 3A and/or at least one DVD may have the configuration shown in FIG. 3B. The HDD may be a mini HDD that includes one or more platters having a diameter that is smaller than approximately 1.8". VoIP phone 600 may be connected to memory 606, which may be a RAM, ROM, low latency nonvolatile memory such as flash memory and/or other suitable electronic data storage. VoIP phone 600 is configured to establish communications link with a VoIP network (not shown) via Wi-Fi communication module 608 which may implement the antenna selection and training techniques described herein.

Moreover, while the antenna selection and training techniques has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method of antenna selection within a communication system having a first transceiver device having a plurality of transmission antennas and a second transceiver device having a plurality of receiving antennas, the method comprising:

encoding transmission data to produce one or more encoded spatial data streams for transmission via a number of transmitting chains, wherein the number of encoded spatial data streams is different than the number of transmitting chains to be used to transmit the encoded spatial data streams and wherein the number of transmitting chains is less than the number of transmission antennas;

using a spatial spreading matrix to distribute the one or more encoded spatial data streams to the number of transmission chains, wherein the spatial spreading matrix has components associated with a row dimension having a number of rows equal to the number of transmission chains to be used to transmit the encoded spatial data streams and a column dimension having a number of columns equal to the number of encoded spatial data streams to be transmitted; and selecting one or more of the plurality of transmission antennas to be used to transmit data to one or more of the plurality of receiving antennas via a channel estimation matrix between the first transceiver device and the second transceiver device, wherein the channel estimation matrix has components associated with a row dimension having a number of rows equal to a number of receiving chains and a column dimension having a number of columns equal to the number of encoded spatial data streams to be transmitted, and wherein selecting the one or more of the plurality of transmission antennas comprises accounting for the spatial spreading matrix in the channel estimation matrix.

2. The method of claim 1, wherein selecting the one or more of the plurality of transmission antennas comprises removing the spatial spreading matrix from the channel estimation matrix to determine a chain-to-chain channel matrix between the plurality of transmission antennas and the plurality of receiving antennas and selecting one or more of the plurality of transmission antennas associated with the chain-to-chain channel matrix.

3. The method of claim 1, wherein selecting one or more of the plurality of transmission antennas to be used to transmit data to one or more of the plurality of receiving antennas via a channel matrix between the first transceiver device and the second transceiver device comprises:

searching potential channel sub-matrices within a full-dimensional channel matrix corresponding to a full-dimensional description of the channel between the plurality of transmission antennas and the plurality of receiving antennas, wherein the full-dimensional channel matrix has components associated with a row dimension having a number of rows equal to the number of receiving antennas and a column dimension having a number of columns equal to the number of transmission antennas, and wherein each channel sub-matrix has components associated with a row dimension having a number of rows equal to the number of receiving chains and a column dimension having a number of columns equal to the number of transmitting chains;

selecting one of the channel sub-matrices based on an optimality criterion, wherein the channel estimation matrix used to transmit the data to one or more of the plurality of receiving antennas comprises the selected channel sub-matrix; and selecting a subset of the plurality of transmission antennas corresponding to the selected channel sub-matrix.

4. The method of claim 3, wherein selecting one of the channel sub-matrices based on an optimality criterion comprises:

developing two or more test steering matrices each corresponding to a different channel sub-matrix;

applying each test steering matrix to the corresponding channel sub-matrix;

applying the spatial spreading matrix to each channel sub-matrix once the test steering matrix has been applied;

transmitting test signals from the first transceiver device to the second transceiver device using each of the two or more test steering matrixes and using the spatial spreading matrix;

determining a quality factor associated with each of the transmitted test signals;

selecting one of the channel sub-matrices as the channel estimation matrix used to transmit the data based on the determined quality factors; and selecting the transmission antennas corresponding to the selected channel sub-matrix.

5. The method of claim 3, further comprising right-multiplying each potential channel sub-matrix with the spatial spreading matrix to form a corresponding channel sub-matrix having components associated with a row dimension having a number of rows equal to a number of receiving chains and a column dimension having a number of columns equal to the number of encoded spatial data streams to be transmitted.

6. The method of claim 3, wherein searching potential channel sub-matrices within a full-dimensional channel matrix comprises searching all potential channel sub-matrices within the full-dimensional channel matrix, and wherein the spatial spreading matrix comprises a number of first columns in a full-dimensional channel spatial spreading matrix, wherein the full-dimensional channel spatial spreading matrix has components associated with a row dimension having a number of rows equal to the number of transmission chains to be used to transmit the encoded spatial data streams and a column dimension having a number of columns equal to the number of transmission chains to be used to transmit the encoded spatial data streams, wherein the number of first columns in the full-dimensional channel spatial spreading matrix equals the number encoded spatial data streams to be transmitted.

7. The method of claim 1, wherein the channel estimation matrix comprises a sub-channel matrix of a full-dimensional channel matrix corresponding to a full-dimensional description of the channel between the plurality of transmission antennas and the plurality of receiving antennas.

8. The method of claim 1, wherein the number of encoded spatial data streams is less than the minimum of the number of transmission chains and the number of receiving chains.

9. The method of claim 1, wherein the spatial spreading matrix comprises a number of first columns in a full-dimensional channel spatial spreading matrix, wherein the full-dimensional channel spatial spreading matrix has components associated with a row dimension having a number of rows equal to the number of transmission chains to be used to transmit the encoded spatial data streams and a column dimension having a number of columns equal to the number of transmission chains to be used to transmit the encoded spatial data streams, wherein the number of first columns in the full-dimensional channel spatial spreading matrix equals to the number encoded spatial data streams to be transmitted.

10. The method of claim 9, wherein the full-dimensional channel spatial spreading matrix is orthogonal.

11. The method of claim 1, wherein the wherein the first transceiver device is capable of transmitting via a plurality of carriers and the second transceiver device is capable of receiving via the plurality of carriers;

wherein the first transceiver device is an orthogonal frequency division multiplexing (OFDM) transceiver;

wherein the second transceiver device is an OFDM transceiver; and wherein the plurality of carriers is a plurality of OFDM subcarriers.

12. A method of antenna selection within a communication system having a first transceiver device having a plurality of transmission antennas and a second transceiver device having a plurality of receiving antennas, the method comprising:

defining a spatial spreading matrix used to distribute a number of encoded spatial data streams to a number of transmission chains for transmitting the encoded spatial data streams as a first set of columns in a full-dimensional channel spatial spreading matrix, wherein the full-dimensional channel spatial spreading matrix has components associated with a row dimension having a number of rows equal to the number of transmission chains and a column dimension having a number of columns equal to the number of transmission chains, wherein the number of columns in the first set of column in the full-dimensional channel spatial spreading matrix equals the number encoded spatial data streams to be transmitted; and selecting one or more of the plurality of receiving antennas to be used to receive one or more encoded spatial data streams transmitted through a channel estimation matrix between the first transceiver device and the second transceiver device and to be received via a number of receiving chains, wherein the number of encoded spatial data streams is different than the number of transmitting chains used to transmit the encoded spatial data streams and wherein the number of receiving chains is less than the number of receiving antennas, wherein selecting one or more of the plurality of receiving antennas comprises accounting for the defined spatial spreading matrix.

13. The method of claim 12, wherein selecting the one or more of the plurality of receiving antennas comprises removing the spatial spreading matrix from the channel estimation matrix to determine the chain-to-chain channel matrix between the plurality of transmission antennas and the plurality of receiving antennas and selecting the receiving antennas associated with the chain-to-chain channel matrix.

14. The method of claim 12, wherein selecting one or more of the plurality of receiving antennas to be used to receive one or more encoded spatial data streams comprises:

searching potential channel sub-matrices within a full-dimensional channel matrix corresponding to a full-dimensional description of the channel between the plurality of transmission antennas and the plurality of receiving antennas, wherein the full-dimensional channel matrix has components associated with a row dimension having a number of rows equal to the number of receiving antennas and a column dimension having a number of columns equal to the number of transmission antennas, and wherein each channel sub-matrix has components associated with a row dimension having a number of rows equal to the number of receiving chains and a column dimension having a number of columns equal to the number of transmitting chains;

selecting one of the channel sub-matrices based on an optimality criterion, wherein the channel estimation matrix used to transmit the data to one or more of the plurality of receiving antennas comprises the selected channel sub-matrix; and selecting the receiving antennas corresponding to the selected channel sub-matrix.

15. The method of claim 14, wherein selecting one of the channel sub-matrices based on an optimality criterion comprises:

developing two or more test steering matrices each corresponding to a different channel sub-matrix;

applying each test steering matrix to the corresponding channel sub-matrix;

applying the spatial spreading matrix to each channel sub-matrix once the test steering matrix has been applied;

transmitting test signals from the first transceiver device to the second transceiver device using each of the two or more test steering matrixes and using the spatial spreading matrix;

determining a quality factor associated with each of the transmitted test signals;

selecting one of the channel sub-matrices as the channel estimation matrix used to receive the data based on the determined quality factors; and selecting the receiving antennas corresponding to the selected channel sub-matrix.

16. The method of claim 14, further comprising right-multiplying each potential channel sub-matrix with the spatial spreading matrix to form a corresponding channel sub-matrix having components associated with a row dimension having a number of rows equal to a number of receiving chains and a column dimension having a number of columns equal to the number of encoded spatial data streams to be transmitted.

17. The method of claim 14, wherein searching potential channel sub-matrices within a full-dimensional channel matrix comprises searching all potential channel sub-matrices within the full-dimensional channel matrix.

18. The method of claim 12, wherein the channel estimation matrix comprises a sub-channel matrix of a full-dimensional channel matrix corresponding to a full-dimensional description of the channel between the plurality of transmission antennas and the plurality of receiving antennas.

19. The method of claim 12, wherein the number of encoded spatial data streams is less than the minimum of the number of transmission chains and the number of receiving chains.

20. The method of claim 12, wherein the full-dimensional channel spatial spreading matrix is orthogonal.

21. The method of claim 12, wherein the wherein the first transceiver device is capable of transmitting via a plurality of carriers and the second transceiver device is capable of receiving via the plurality of carriers;

wherein the first transceiver device being an orthogonal frequency division multiplexing (OFDM) transceiver;

wherein the second transceiver device is an OFDM transceiver; and wherein the plurality of carriers is a plurality of OFDM subcarriers.

22. A method of antenna selection training for a transceiver device having a plurality of antennas, wherein the antennas are selected for a data transmission of one or more encoded spatial data streams via a channel estimation matrix having a number of transmitting and receiving chains between one or more transmission antennas and one or more receiving antennas, the method comprising:

searching potential channel sub-matrices within a full-dimensional channel matrix corresponding to a full-dimensional description of the channel between a plurality of transmission antennas and a plurality of receiving antennas, wherein the full-dimensional channel matrix has components associated with a row dimension having a number of rows equal to the number of receiving antennas and a column dimension having a number of columns equal to the number of transmission antennas, and wherein each channel sub-matrix has components associated with a row dimension having a number of rows equal to the number of receiving chains to be used to receive the data and a column dimension having a number of columns equal to the number of transmitting chains to be used to transmit the data, wherein the number of encoded spatial data streams is less than the minimum of the number of transmission chains and the number of receiving chains, and the number of receiving chains is less than the number of receiving antennas and/or the number of transmitting chains is less than the number of transmission antennas;

right-multiplying each potential channel sub-matrix with a spatial spreading matrix to form a corresponding channel sub-matrix having components associated with a row dimension having a number of rows equal to a number of receiving chains and a column dimension having a number of columns equal to the number of encoded spatial data streams to be transmitted, wherein the spatial spreading matrix has components associated with a row dimension having a number of rows equal to the number of transmission chains to be used to transmit the encoded spatial data streams and a column dimension having a number of columns equal to the number of encoded spatial data streams to be transmitted, selecting one of the channel sub-matrices based on an optimality criterion, wherein a channel estimation matrix used to transmit the data from the one or more transmission antennas to the one or more receiving antennas comprises the selected channel sub-matrix; and selecting the antennas corresponding to the selected channel sub-matrix.

23. The method of claim 22, wherein selecting one of the channel sub-matrices based on an optimality criterion comprises:

developing two or more test steering matrices each corresponding to a different channel sub-matrix;

applying each test steering matrix to the corresponding channel sub-matrix;

applying the spatial spreading matrix to each channel sub-matrix once the test steering matrix has been applied;

transmitting test signals from one or more of the transmission antennas to one or more of the receiving antennas using each of the two or more test steering matrixes and using the spatial spreading matrix;

determining a quality factor associated with each of the transmitted test signals;

selecting one of the channel sub-matrices as the channel estimation matrix used to transmit the data based on the determined quality factors; and selecting the antennas corresponding to the selected channel sub-matrix.

24. The method of claim 22, wherein the spatial spreading matrix comprises a number of first columns in a full-dimensional channel spatial spreading matrix, wherein the full-dimensional channel spatial spreading matrix has components associated with a row dimension having a number of rows equal to the number of transmission chains to be used to transmit the encoded spatial data streams and a column dimension having a number of columns equal to the number of transmission chains to be used to transmit the encoded spatial data streams, wherein the number of first columns in the full-dimensional channel spatial spreading matrix equals the number encoded spatial data streams to be transmitted.

25. An apparatus within a transmission system having two or more antennas comprising:

a spatial spreading calculation unit to produce a spatial spreading matrix to distribute one or more encoded spatial data streams among a number of chains within a chain-to-chain transmission through a channel matrix, wherein the number of encoded spatial data streams is less than the minimum of the number of transmission chains and the number of receiving chains, wherein the channel estimation matrix has components associated with a row dimension having a number of rows equal to a number of receiving chains and a column dimension having a number of columns equal to the number of encoded spatial data streams, and wherein the number of transmission chains and/or the number of receiving chains is less than the number of antennas; and a controller coupled to the spatial spreading calculation unit to control the selection of the two or more antennas used in the chain-to-chain transmission using the spatial spreading matrix;

wherein the spatial spreading matrix has components associated with a row dimension having a number of rows equal to the number of transmission chains used the transmission of the encoded spatial data streams and a column dimension having a number of columns equal to the number of encoded spatial data streams.

26. The apparatus of claim 25, wherein the apparatus comprises a wireless receiver for receiving signals from a wireless transmitter.

27. The apparatus of claim 26, wherein the two or more antennas comprise two or more transmission antennas in the wireless transmitter, and wherein the controller is configured to control the selection of the two or more transmission antennas in the wireless transmitter for transmitting the encoded spatial data streams to the wireless receiver.

28. The apparatus of claim 26, wherein the two or more antennas comprise two or more receiving antennas in the wireless receiver, and wherein the controller is configured to control the selection of the two or more receiving antennas in the wireless receiver for receiving the encoded spatial data streams from the wireless transmitter.

29. The apparatus of claim 26, wherein the spatial spreading matrix is predefined to comprise a number of first columns in a full-dimensional channel spatial spreading matrix, wherein the full-dimensional channel spatial spreading matrix has components associated with a row dimension having a number of rows equal to the number of transmission chains to be used to transmit the encoded spatial data streams and a column dimension having a number of columns equal to the number of transmission chains to be used to transmit the encoded spatial data streams, wherein the number of first columns in the full-dimensional channel spatial spreading matrix equals to the number encoded spatial data streams to be transmitted.

30. The apparatus of claim 26, wherein the spatial spreading matrix is predefined by a communication protocol used by the receiver to communicate with the transmitter.

* * * * *